US009521166B2

(12) United States Patent
Wilson

(10) Patent No.: US 9,521,166 B2
(45) Date of Patent: Dec. 13, 2016

(54) SYSTEMS AND METHODS FOR TESTING ONLINE SYSTEMS AND CONTENT

(71) Applicant: Jeffrey Todd Wilson, Ashburn, VA (US)

(72) Inventor: Jeffrey Todd Wilson, Ashburn, VA (US)

(73) Assignee: AOL Inc., Dulles, VA (US)

( * ) Notice: Subject to any disclaimer, the term of this patent is extended or adjusted under 35 U.S.C. 154(b) by 105 days.

(21) Appl. No.: 13/763,343

(22) Filed: Feb. 8, 2013

(65) Prior Publication Data

US 2013/0212638 A1 Aug. 15, 2013

Related U.S. Application Data

(60) Provisional application No. 61/597,156, filed on Feb. 9, 2012.

(51) Int. Cl.
| | |
|---|---|
| *H04L 29/06* | (2006.01) |
| *G06Q 10/10* | (2012.01) |
| *G06Q 50/26* | (2012.01) |
| *G06F 21/64* | (2013.01) |
| *G06F 11/36* | (2006.01) |

(52) U.S. Cl.
CPC ............ *H04L 63/20* (2013.01); *G06F 11/3688* (2013.01); *G06F 21/645* (2013.01); *G06Q 10/10* (2013.01); *G06Q 50/26* (2013.01)

(58) Field of Classification Search
CPC ........... H04L 63/20; G06F 11/36; G06F 21/64
See application file for complete search history.

(56) References Cited

U.S. PATENT DOCUMENTS

| 7,293,281 | B1* | 11/2007 | Moran et al. ................. 726/3 |
| 8,370,475 | B1* | 2/2013 | Harvey et al. ............... 709/223 |
| 2002/0002595 | A1* | 1/2002 | Blumenau ..................... 709/218 |
| 2002/0010784 | A1* | 1/2002 | Clayton et al. .............. 709/229 |
| 2003/0066031 | A1* | 4/2003 | Laane .......................... 715/513 |
| 2006/0069616 | A1* | 3/2006 | Bau ............................. 705/14 |
| 2006/0242320 | A1* | 10/2006 | Nettle et al. ................ 709/245 |

(Continued)

OTHER PUBLICATIONS

International Search Report and Written Opinion mailed on May 7, 2013, in corresponding International Application No. PCT/US2013/025325 (11 pages).

*Primary Examiner* — Brandon Hoffman
*Assistant Examiner* — Wasika Nipa
(74) *Attorney, Agent, or Firm* — Finnegan, Henderson, Farabow, Garrett & Dunner, LLP

(57) ABSTRACT

Systems and methods are provided for automatically monitoring a compliance of web pages and graphical user interfaces with governmental and self-regulatory privacy and security policies. In accordance with one implementation, a method is provided that comprises instructing the execution of an operation on content associated with at least one web page is generated. The operation may include at least one of (i) a scanning operation that generates forensic data corresponding to the web page or (ii) an analytical operation that analyzes at least a portion of the forensic data corresponding to the web page. The method further comprises obtaining output data associated with the executed operation, and generating information indicative of a compliance of the web page with at least one of a privacy regulation or a security regulation, the information being generated based on the output data.

27 Claims, 12 Drawing Sheets

(56) References Cited

U.S. PATENT DOCUMENTS

| | | | |
|---|---|---|---|
| 2009/0178006 A1* | 7/2009 | Lemay et al. | 715/835 |
| 2009/0293018 A1* | 11/2009 | Wilson et al. | 715/811 |
| 2011/0145628 A1 | 6/2011 | Wilson | |
| 2011/0191664 A1* | 8/2011 | Sheleheda et al. | 715/205 |
| 2011/0219110 A1* | 9/2011 | Pfeffer et al. | 709/224 |
| 2012/0144291 A1* | 6/2012 | Chang et al. | 715/234 |

* cited by examiner

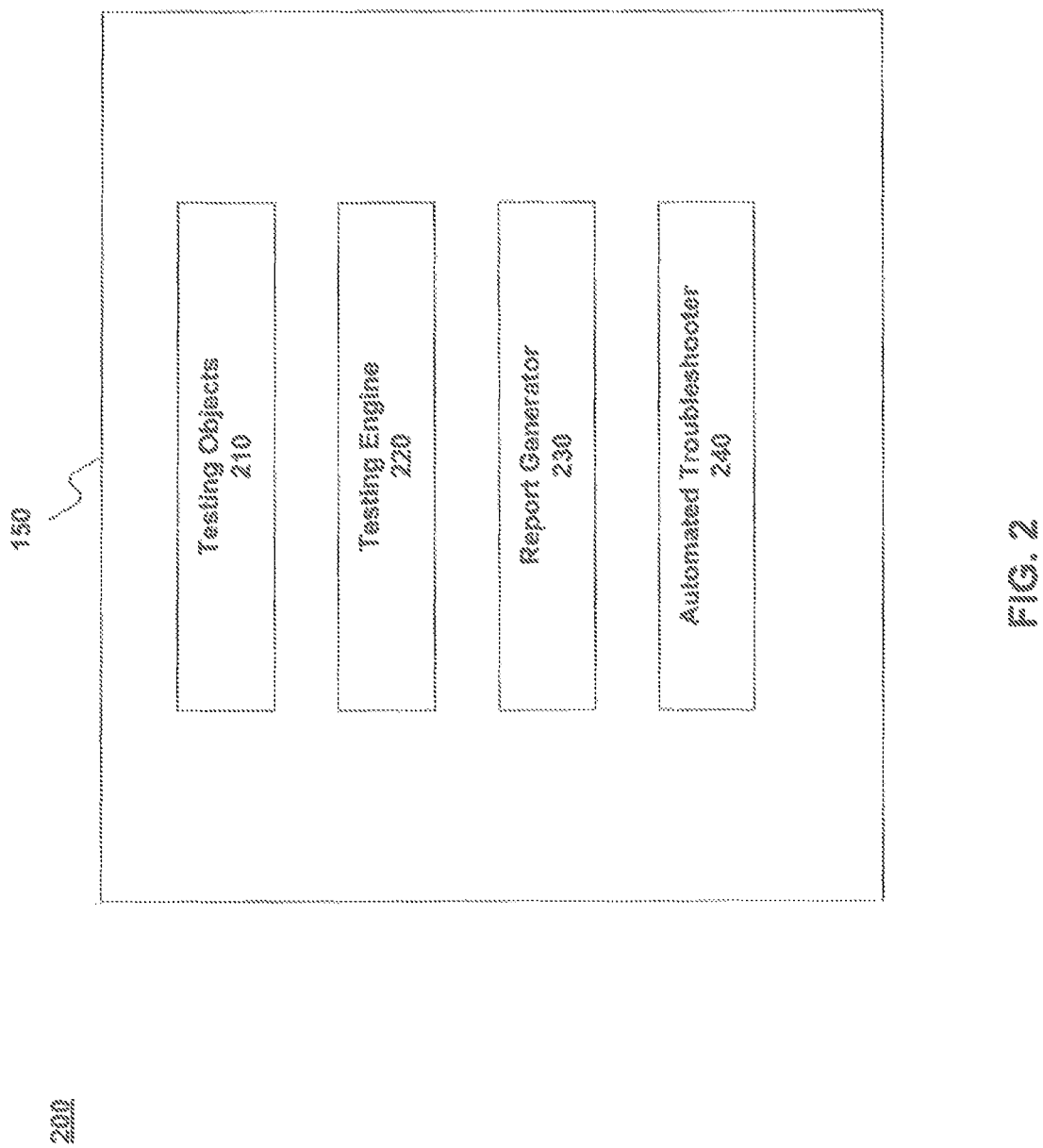

| Present Cookie | Received | Result |
|---|---|---|
| None | Opt-Out Cookie | Opt-Out Cookie |
| 1 Ad.com Cookie | Opt-Out Cookie | Opt-Out Cookie |
| Opt-Out Cookie | Opt-Out Cookie | Opt-Out Cookie |

SYSTEMS AND METHODS FOR TESTING ONLINE SYSTEMS AND CONTENT

CROSS-REFERENCE TO RELATED APPLICATIONS

This application claims the benefit of priority to U.S. Provisional Patent Application No. 61/597,156, filed Feb. 9, 2012, the entire disclosure of which is expressly incorporated herein by reference in its entirety.

BACKGROUND

Technical Field

The present disclosure generally relates to the field of computerized data processing and monitoring techniques. More particularly, and without limitation, the disclosure relates to computer-implemented methods and systems for generating data associated with web pages and web content, and for analyzing the generated data to ensure compliance with online privacy regulations.

Background

Online advertising has become a billion dollar industry in today's digital content-driven economy. The portability of digital content using mobile computing devices, such as smart phones and media players, has expanded the reach of online advertisers beyond traditional personal computer users. Advertisers and publishers of online content, however, desire accurate estimates of the performance of advertisements, such as the performance of a particular advertisement associated with a specific location on a website, in order to ensure effective ad placement.

Many advertisers and publishers of online content may therefore implement ad tracking systems or methods to monitor consumer behavior and generate accurate demographic profiles of consumers that view specific web sites and respond to certain advertisements. For example, advertisers and publishers of online content may utilize tracking or browser cookies that collect information on a consumer's browsing habits, which enable the targeting of specific advertisements and online content to the consumer based on his or her browsing habits.

With the growing volume of daily Internet traffic, many consumers now view of the presence of such tracking and monitoring techniques as a threat to their privacy and security. Due to this reaction, governmental entities and self-regulatory bodies now require advertisers and publishers of online content to protect consumer privacy by complying with various restrictions on their tracking and monitoring activities. For example, advertisers and publishers of online content may be required to provide consumers with an opportunity to "opt-out" of behavioral monitoring and tracking activity, to limit data collection on sites geared to children, and to limit sharing of collected data with third-parties. However, the increasing of content available across the Internet, and the increasing number of web pages, makes it increasingly difficult for advertisers and publishers of online content to cost-effectively monitor their compliance with these privacy and security policies.

In view of the foregoing, there is a need for improved systems and methods for ensuring the compliance of an advertiser or content provider with governmental and self-regulatory privacy and security policies. There is also a need for improved systems and methods for monitoring the performance of opt-out systems required under these privacy regulations. Such systems and methods may be implemented in computer-based environments, such as the Internet and network environments that provide online content and/or services to users.

SUMMARY

Consistent with embodiments of the present disclosure, computer-implemented methods are provided. In one implementation, a method is provided that includes, among other things, generating an instruction to execute an operation on content associated with at least one web page. The operation may include at least one of (i) a scanning operation that generates forensic data corresponding to the web page or (ii) an analytical operation that analyzes at least a portion of the forensic data corresponding to the web page. The method further includes obtaining output data associated with the executed operation, and based on the output data, generating, using a processor, information indicative of a compliance of the web page with at least one of a privacy regulation or a security regulation.

Consistent with additional embodiments of the present disclosure, a computer-implemented method is provided that includes, among other things, obtaining forensic data associated with at least one web page, and performing an analytical operation on the forensic data using at least one processor. The analytical operation may include at least one of an operation performed on a hyperlink within the forensic data, a test performed on an image call within the forensic data, an operation applied to a locally-stored object within the forensic data, or an operation applied to an image of the web page, a page object, or a request within the forensic data. The method further includes generating output data associated with the analytical operation. The output may be indicative of a compliance of the web page with at least one of a privacy regulation or a security regulation.

Consistent with still further embodiments of the present disclosure, a computer-implemented method is provided that includes, among other things, performing, using at least one processor, a scanning operation on at least one web page, obtaining, in response to the performance, forensic data indicative of a compliance of the web page with at least one of a privacy regulation or a security regulation, and generating an instruction to store at least a portion of the forensic data in a repository.

Consistent with yet another embodiment of the present disclosure, an apparatus is provided that includes a storage device and at least one processor coupled to the storage device. The storage device stores a program for controlling the at least one processor, and the at least one processor, being operative with the program, is configured to instruct the execution of an operation on content associated with at least one web page. The operation may include at least one of (i) a scanning operation that generates forensic data corresponding to the web page or (ii) an analytical operation that analyzes at least a portion of the forensic data corresponding to the web page. The at least one processor is further configured to obtain output data associated with the executed operation, and generate information indicative of a compliance of the web page with at least one of a privacy regulation or a security regulation based on the output data.

Consistent with a further embodiment of the present invention, a tangible, non-transitory computer-readable medium stores instructions that, when executed by at least one processor, perform steps including causing the execution of an operation on content associated with at least one web page. The operation may include at least one of (i) a scanning operation that generates forensic data corresponding to the web page or (ii) an analytical operation that analyzes at least a portion of the forensic data corresponding to the web page. The instructions further cause the processor to perform other steps, including obtaining output data associated with the executed operation, and generating information indicative of a compliance of the web page with at least one of a privacy regulation or a security regulation based on the output data.

It is to be understood that both the foregoing general description and the following detailed description are exemplary and explanatory only, and are not restrictive of embodiments consistent with the present disclosure. Further, the accompanying drawings, which are incorporated in and constitute a part of this specification, illustrate embodiments of the present disclosure and together with the description, serve to explain principles of the present disclosure.

BRIEF DESCRIPTION OF THE DRAWINGS

The accompanying drawings, which are incorporated in and constitute a part of this disclosure, illustrate several embodiments and aspects of the present disclosure, and together with the description, serve to explain certain principles of the presently disclosed embodiments. In the drawings:

FIG. 2 is a block diagram of an exemplary test system, consistent with embodiments of the present disclosure.

FIG. 6 illustrates an exemplary tabular representation of settings of an opt-out cookie on a test system, consistent with embodiments of the present disclosure.

DESCRIPTION OF THE EMBODIMENTS

Reference will now be made in detail to embodiments of the present disclosure, examples of which are illustrated in the accompanying drawings. The same reference numbers will be used throughout the drawings to refer to the same or like parts.

In this application, the use of the singular includes the plural unless specifically stated otherwise. In this application, the use of 'or' means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

Figure 1A:
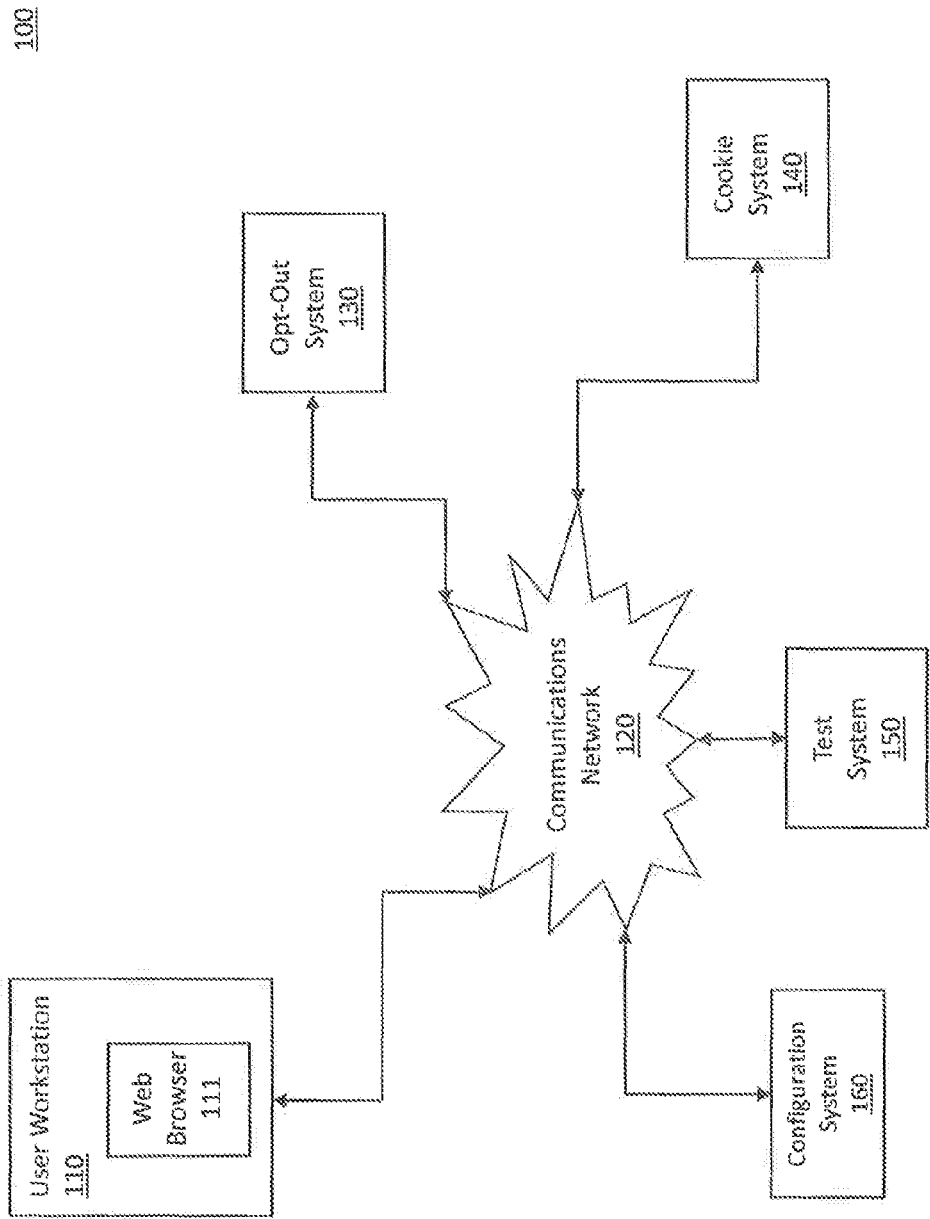
FIG. 1A is a diagram of an exemplary computing environment for practicing embodiments consistent with the present disclosure.

FIG. 1A illustrates an exemplary computing environment 100 for practicing embodiments of the present disclosure. Environment 100 may include a user workstation 110, an opt-out system 130, an advertising system 140 (e.g., a cookie system), a test system 150, and a configuration system 160 interconnected via a communications network 120. Any combination of opt-out system 130, advertising system 140, test system 150, and configuration system 160 may be operated by one or more operators (e.g., advertising network or a content-providing network).

Communications network 120 may represent any form or medium of digital data communication. Examples of communication network 130 include a local area network ("LAN"), a wireless LAN, e.g., a "WiFi" network, a wireless Metropolitan Area Network (MAN) that connects multiple wireless LANs, a wide area network ("WAN"), e.g., the Internet, and a dial-up connection (e.g., using a V.90 protocol or a V.92 protocol). In the embodiments described herein, the Internet may include any publicly-accessible network or networks interconnected via one or more communication protocols, including, but not limited to, hypertext transfer protocol (HTTP) and transmission control protocol/internet protocol (TCP/IP). Moreover, communications network 120 may also include one or more mobile device networks, such as a GSM network or a PCS network, that allow mobile devices, such as client device 802, to send and receive data via applicable communications protocols, including those described above.

User workstation 110 may include, for example, a personal computer, a laptop, a handheld computer, a personal digital assistant ("PDA"), a mobile device, a single server (or a component thereof), or any other computing platform capable of executing a web browser 111 (e.g., Microsoft Internet Explorer, Apple Safari, and Mozilla Firefox) and receiving cookies, storing cookies, and/or facilitating state management. Although only a single user workstation 110 is illustrated in FIG. 1, environment 100 may include a plurality of such user workstations 110, each of which is associated with a different or unique user.

A user at user workstation 110 may choose to opt-out from having his or her usage patterns and web preferences collected for purposes of targeted or behavioral advertising programs implemented by, for example, advertising system 140. As further described below, the user may opt-out to maintain his or her privacy by enrolling in an opt-out system, such as opt-out system 130. In an embodiment, the opt-out system 130 may prevent the user from being part of one or more advertising systems' targeted advertising programs, and also prevent user workstation 110 from receiving associated targeting or tracking cookies from advertising system 140.

Advertising system 140 may include a personal computer, a single server (or a component thereof), multiple servers arranged as part of an integrated or distributed system, a server farm, a network of servers, etc. Advertising system 140 may correspond to or be part of one or more advertising networks that provide online advertising. Advertising system 140 may include one or more servers or components for transmitting and receiving cookies, and additionally or alternatively, facilitating state management. Additionally, advertising system 140 may include one or more servers or components for delivering online advertisements, such a plurality servers that are part of a content delivery network. While only a single advertising system 140 is illustrated in FIG. 1A, it will be appreciated that the exemplary environment 100 may including a plurality of advertising systems 140 that are owned or operated by one or more entities. Further, there may be one or more opt-out systems 130, wherein each opt-out system 130 is associated with one or more advertising systems 140 that use cookies and any additional or alternative state management mechanism (e.g., HTML5).

Advertising system 140 may be configured to transmit targeting or tracking cookies to user workstations of users that have not opted-out from receiving such cookies. These and other types of cookies may be transmitted when a user visits and browses one or more websites in, for example, an advertising network. As described above, cookies stored on non-opted-out users' workstations 110 may allow the advertising system 140 to track online usage and user preferences to transmit targeted advertising. In contrast, for users that have elected to opt-out from such cookies, no such targeting or tracking cookies may be utilized and, as a result, a user's workstation 110 of an opt-out user may only receive general or non-targeted advertisements.

To opt-out from receiving targeting or tracking cookies from one or more advertising systems 140, a user may execute a web browser 111 (e.g., Microsoft Internet Explorer, Apple Safari, or Mozilla Firefox) on user workstation 110. Through browser 111, the user may navigate to a website associated with opt-out system 130. Once connected through network 120, the website of opt-out system 130 may be displayed to the user in browser 111, including web pages with various opt-out options.

By way of example, the user may select elements on pages of the website displayed in browser 111 to opt-out from receiving targeted advertisements from one or more advertising systems 140. For instance, a list of different advertising systems or networks may be displayed to the user in browser 111. Additionally, or optionally, each listed advertising system or network may have a corresponding status. The status may indicate what kind of cookie (e.g., active cookie, opt-out cookie, no cookie), if any, user workstation 110 has previously received and stored. Based on the list, the user may elect to opt-out user workstation 110 for one or more advertising systems 140 that use targeting or tracking cookies.

Based on the opt-out options selected by a user, opt-out system 130 may then send instructions to advertising system 140 to cause advertising system 140 to create and send an opt-out cookie to user workstation 110. In response, advertising system 140 may create and send an opt-out cookie to user workstation 110. Opt-out system 130 may then display a message to the user in browser 111 whether user workstation 110 was successfully opted-out from each advertising system or network that the user selected.

The disclosed embodiments are not limited to such exemplary opt-out techniques. In a further embodiment, and in response to the opt-out options selected by the user, opt-out system 130 may delete tracking information associated with the user. Opt-out system 130 may then replace the deleted tracking information with opt-out information (e.g., an opt-out cookie or flag), which may be visible to and respected by advertising system 140. As described above, opt-out system 130 may then display a message to the user in browser 111 indicating whether user workstation 110 was successfully opted-out from the selected advertising system or network.

After user workstation 110 receives an opt-out cookie from an advertising system 140, the advertising system 140 may not be able to track the activities of user workstation 110 when a user visits a website in the advertising network(s) associated with advertising system 140 (i.e., advertising system 140 does not collect data identifying the user's activity). In additional embodiments, the receipt of the opt-out cookie by user workstation 111 may enable advertising system 140 to collect information identifying the activities of the user and generate corresponding profiles, while preventing advertising server 140 from providing targeted advertisements to the user.

Whenever browser 111 visits a website in the advertising network of advertising system 140, user workstation 110 may send a request (such as for a banner ad or other file) to advertising system 140. Along with the request, browser 111 will transmit any previously stored cookies associated with advertising system 140. If user workstation 110 has an opt-out cookie corresponding to the advertising network of advertising system 140, the opt-out cookie (e.g., with a value of "optout") will be transmitted back to the advertising system 140. Advertising system 140 may determine based on the opt-out cookie that user workstation 110 has opted-out of targeted advertising programs and, therefore, determine not to use targeting or tracking cookies to track any activity or behavior of the user of user workstation 110. As a result, only untargeted ads may be transmitted to user workstation 110.

Test system 150 may include a personal computer, a single server (or a component thereof), multiple servers arranged as part of an integrated or distributed system, a server farm, a network of multiple servers, etc. Test system 150 may also be adapted to run or emulate different workstations and operating systems, as well as web browsers (e.g., Microsoft Internet Explorer, Apple Safari, Mozilla Firefox, or Google Chrome). When implemented, test system 150 may automatically test whether an opt-out system operates properly and in accordance with the privacy preferences of the user at user workstation 110. Among other things, test system 150 may send requests to opt-out system 130 and advertising system 140 through network 120. Test system 150 may also receive streams from opt-out system 130 and advertising system 140 through network 120. In such embodiments, the received streams may represent network protocol information transmitted between devices across network 120, which includes, but is not limited to, HTTP or HTTPS messages.

Consistent with embodiments of the present disclosure, test system 150 may run a series of different tests periodically or at a predetermined interval (e.g., every hour). Settings of test system 150 may be configured before each test or series of different tests to simulate and analyze, for example, certain environmental conditions. Environmental conditions may include, but are not limited to, different privacy settings, different browsers, variations in computer host files (e.g., that may manage DNS settings), the presence of different anti-spyware software, changing locations of test system 150, different existing cookies present on test system 150, and modifications of Uniform Resource Locator (URL) and header values, such as user agent or "do not track" (DNT) signals.

Consistent with embodiments of the present disclosure, test system 150 may simulate new environmental conditions after a series of different tests are completed. In addition, test system 150 may repeat or rerun the series of different tests with the new environmental conditions. Test system 150 may also simulate a plurality of different environmental conditions during each interval, and run a series of different tests for each one of the environmental conditions.

In running a series of different tests, test system 150 may test that one or more opt-out system 130 are functioning properly. As described above, each opt-out system 130 may allow a user to opt-out from receiving targeted advertising and associated cookies from one or more advertising systems 140. Testing opt-out system 130 may ensure, among other things, that a user can access and successfully complete or enroll in the opt-out process, and that each of the opt-out portals or systems (e.g., opt-out system 130) are in mutual agreement regarding the opt-out status of the user (e.g., that of the opt-out systems or networks does not report the user is being tracked while another of the opt-out systems or networks reports the user is opted out).

To conduct a test of opt-out system 130, test system 150 may send one or more requests to opt-out system 130. Each request may represent one or more requests in the form that a browser would send to opt-out system 130. In other words, test system 150 may emulate requests from the browser of a user who is trying to opt-out through a website associated with opt-out system 130. Parameters of a request may differ based on the test and the environmental conditions. Among other things, a test may check that the website of opt-out system 130 is functioning, check that web pages (e.g., opt-out pages, privacy policy page, opt-out links pages, etc.) of the website are operating properly, check that links between the web pages of the website are operating properly, check that necessary elements to selectively opt-out from various advertising networks or systems are present on the related web pages, and check that if a user were to select any elements (e.g., an element to opt-out from an advertising network) that the opt-out system would respond appropriately.

Test system 150 may receive a stream back from opt-out system 130 in response to the request(s) transmitted from test system 150. A stream may include one or more files, a text string, a character, a numerical value, a code, etc. Streams may be generated by opt-out system 130 after processing requests received from test system 150. Test system 150 may receive multiple individual streams in response to a single request. The number of streams received by test system 150 from each opt-out system 130 may vary based on the number of requests that are transmitted. In one embodiment, test system 150 may selectively receive or process only the streams test system 150 needs to determine an outcome of a test. Selectively receiving a stream may include determining whether the stream is necessary to determine the outcome of the test, and receiving or processing the stream only when the determination is positive.

Test system 150 may analyze a stream to identify relevant content within the stream that is desired to determine the outcome of a test. Test system 150 may perform any desired analysis and/or measurement of the identified content to determine the outcome of a test. For example, test system 150 may determine that a website/web-page associated with opt-out system 130 is functioning when a stream is received in the form of a specific response, such as an HTTP 200 OK result code, which indicates individually or with information provided in the response that the HTTP request has succeeded.

In accordance with embodiments of the present disclosure, test system 150 may perform one or more tests, as part of a series of different tests to determine whether opt-out system 130 or advertising system 140 properly recognizes the cookies stored on test system 150. Test system 150 may create, or may cause to be created (e.g., through the generation of an appropriate instruction or command) different types of cookies (e.g., advertising network cookie, opt-out cookie, no cookie). Test system 150 may send a request to opt-out system 130 for opt-out system 130 to identify the types of cookies stored on test system 150. Test system 150 may receive a stream from opt-out system 130 including identification of a type of cookie stored on test system 150 for a particular advertising network or advertising system 140. Test system 150 may also test whether opt-out system 130 correctly identifies the type of cookies stored on test system 150 on a website associated with opt-out system 130. Test system 150 may further test that the correct indicator for identifying a type of cookie is properly displayed or otherwise indicated on a website associated with opt out system 130. In accordance with an embodiment, test system 150 may test that the indicator is properly displayed by running a checksum on an image file of the indicator or by applying one or more pattern or image recognition algorithms to the image file.

In accordance with additional embodiments, test system 150 may perform one or more tests to determine whether opt-out system 130 properly interacts with each corresponding advertising system 140. Test system 150 may also perform one or more tests to determine whether each advertising system 140 is responding correctly to the interaction with opt-out system 130. To perform a test relating to the interaction of opt-out system 130 and an advertising system 140, test system 150 may send a request for opt-out system 130 to prompt an advertising system 140 to run a script. Thereafter, the advertising system 140 may run the script to create an opt-out cookie and send the opt-out cookie to test system 150. The request simulates a selection (by a user) to opt-out test system 150 from the advertising network associated with the advertising system 140.

In additional embodiments, opt-out system 130 may be configured to generate as opt-out cookie, which may be recognized and respected by advertising system 140. In such embodiments, to perform the test relating to the interaction of opt-out system 130 and an advertising system 140, test system 150 may send an additional request for opt-out system 130 to run a script to create the opt-out cookie and send the opt-out cookie to test system 150.

Test system 150 may send a request to opt-out system 130 to test that only the advertising systems 140 corresponding to advertising networks that are selected for the opt-out process and that are prompted to create opt-out cookies (e.g., if a user selects to opt-out only out of receiving cookies from a particular advertising network, only the advertising system corresponding to that advertising network is prompted to run a script to create an opt-out cookie). Test system 150 may send a request to an advertising system 140 to test that the correct script is called to create a cookie. The advertising system 140 may then run a script to create an opt-out cookie for test system 150 in response to a prompt or instruction from opt-out system 130, or alternatively, opt-out system 130 may generate the opt-out cookie in response to a request from test system 150.

In accordance with yet additional embodiments, test system 150 may then run tests to determine that test system 150 receives a proper opt-out cookie from each advertising system 140 based on the requests that test system 150 sent to opt-out system 130. After each advertising system 140 creates the opt-out cookie and sends the opt-out cookie to the test system 150, test system 150 may analyze the cookie to determine that values of the cookie are correct. For example, test system 150 may run a test to determine that the lifespan of the opt-out cookie is consistent with predetermined guidelines (e.g., no shorter than 3 or 5 years). Test system 150 may run other tests to determine that other values associated with an opt-out cookie are correct, such as: there is no unique ID parameter to track the cookie or personal information related to the user, all ID values are set to a dummy value (e.g., representing an "opt-out" value), tracking value is set to a predetermined tracking value for opt-out cookies (e.g., 0), etc. Test system 150 may also perform tests based on the type or form of opt-out cookie (e.g., an HTTP cookie or a Flash cookie). Test system 150 may also run tests to determine whether other cookies, besides opt-out cookies, transmitted from advertising system 140 have proper values. For example, test system 150 may run a test to determine that the lifespan of an ad cookie is no longer than a predetermined amount of time.

Test system 150 may run tests to determine whether the opt-out cookie received from an advertising system 140 is set correctly on test system 150 depending on what, if any, cookie corresponding to the advertising system 140 is stored on test system 150 (see, e.g., the exemplary embodiment of FIG. 6). Test system 150 may repeat tests to determine whether opt-out system 130 correctly identifies the type of cookie (e.g., opt-out) on test system 150 and that opt-out system 130 displays the correct indicator on the website of opt-out system 130.

According to still further embodiments, test system 150 may test whether an opt-out cookie set on test system 150 functions properly. Test system 150 may send a request to a website that is connected (directly or indirectly) to an advertising network corresponding to an advertising system 140. To perform the test, test system 150 may send a request directly to the advertising system 140. The advertising system 140 may respond to the request from test system 150. Test system 150 may run a test to determine whether an opt-out cookie is transmitted to the advertising system 140 with or in response to the request.

After test system 150 determines an outcome of one or more individual tests, test system 150 may generate a report based on the outcome of each test. Test system 150 may log the report in a database or in another form on, for example, an internal storage of test system 150 or a storage device external to test system 150. Additionally, or alternatively, test system 150 may transmit a report through email or other suitable communication means. Reports may be sent to owners or operators of an opt-out system or advertising network or system. Additionally, or alternatively, reports may be transmitted to a third party or members of a specific action group associated with an advertising network or advertising system 140. The members of a specific action group may include one or more persons responsible for fixing any failures identified in a report for a particular test. Test system 150 may also transmit such reports when problems or failures are identified by the outcome of a test (i.e., the outcome of the test is negative).

In accordance with additional embodiments, test system 150 may wait until all tests within a series of different tests are completed in an interval before generating one or more reports. Test system 150 may then organize the information from the reports into different emails for specific entities or action groups. Test system 150 may also organize emails for individual members of the specific action groups that compile information from reports based on an individual member's membership in different action groups. Test system 150 may determine a level of seriousness of any failures or problems identified within a series of different tests. The level of seriousness may be based on the number of problems identified and for what specific tests the problems are identified. When a levels of seriousness is above a predetermined threshold, test system 150 may send an alert email to, for example, a privacy group or a specific individual (e.g., a high level manager) who is not a member of any specific action group.

Test system 150 may use configuration system 160 to perform an automated healing procedure to fix any failures or problems that are detected during any tests. As noted above, problems may be detected when the outcome of a test is negative. Test system 150 may convert troubleshooting information in one or more of the generated reports into machine-readable instructions. Test system 150 may transmit the machine-readable instructions to configuration system 160. Alternatively, test system 150 may first compile the machine-readable instructions and then send the compiled machine-readable instructions to configuration system 160.

Configuration system 160 may communicate with each one of test system 150, advertising system 140, and/or opt-out system 130, either directly or through network 120. Configuration system 160 may include a personal computer, a single server (or component thereof), multiple servers arranged in a network or as a server farm, etc. Configuration system 160 may be implemented independently or as part of test system 150. Configuration system 160 may manage each advertising system 140 and opt-out system 130. Configuration system 160, based on the machine-readable instructions or the compiled machine-readable instructions, may perform one or more of the following steps on at least one of opt-out system 130 and advertising system 140: (1) reboot a server; (2) reconfigure a server; (3) reformat a server; and/or (4) remove a server from rotation. Test system 150 may rerun a series of different tests after any one of the foregoing steps is performed by configuration system 160 to make sure that the problem or failure has been corrected.

Figure 1B:
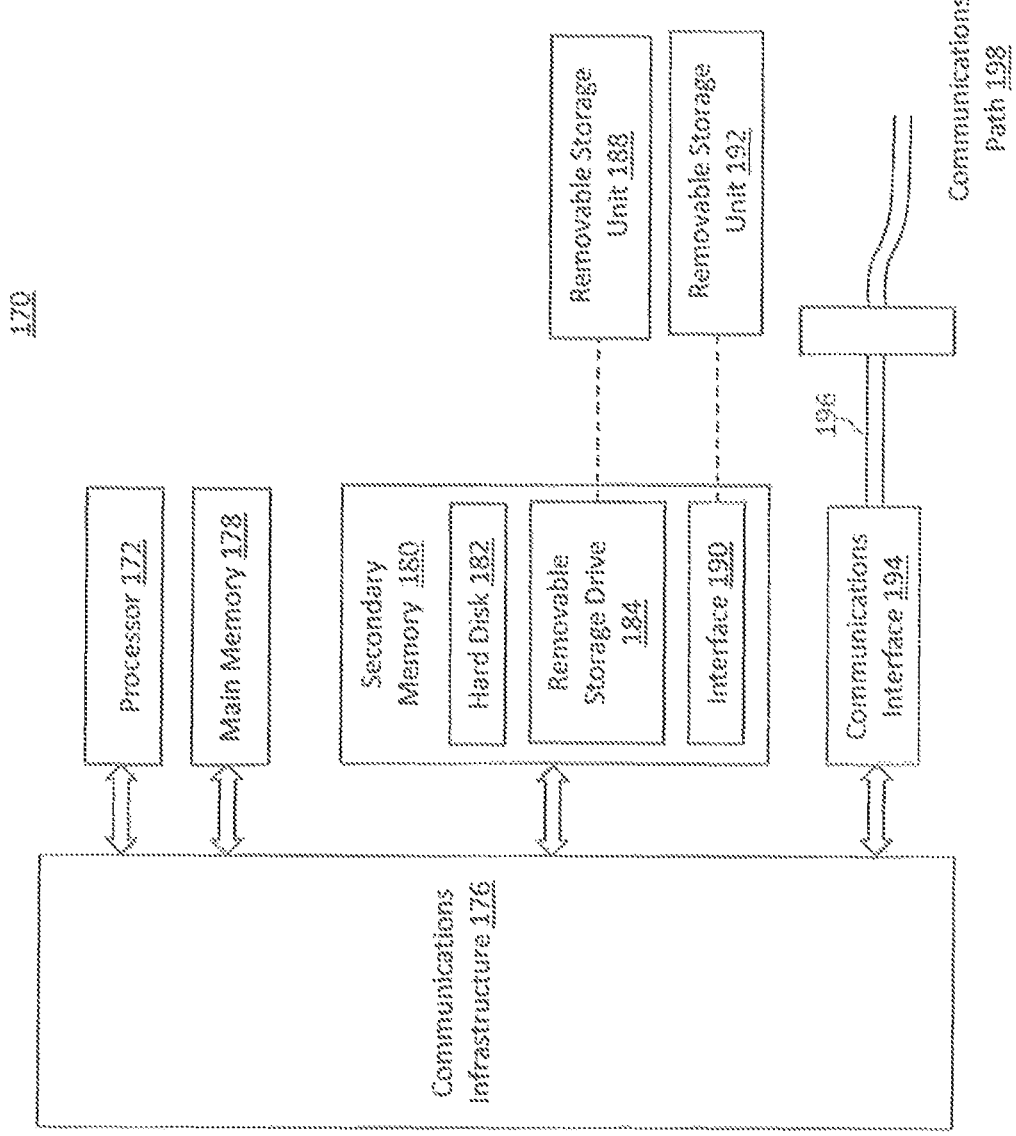
FIG. 1B is a diagram of an exemplary computer system, consistent with embodiments of the present disclosure.

User workstation 110, an opt-out system 130, an advertising system 140, a test system 150, and a configuration system 160, may represent any type of computer system capable of performing communication protocol processing. FIG. 1B is an exemplary computer system 170, according to an embodiment consistent with the present disclosure. Computer system 170 includes one or more processors, such as processor 172. Processor 172 is connected to a communication infrastructure 206, which may comprise a bus or network (e.g., network 120 of FIG. 1A).

Computer system 170 also includes a main memory 178, for example, random access memory (RAM), and may include a secondary memory 180. Secondary memory 180 may include, for example, a hard disk drive 182 and/or a removable storage drive 184, representing a magnetic tape drive, an optical disk drive, CD/DVD drive, etc. The removable storage drive 184 reads from and/or writes to a removable storage unit 188 in a well-known manner. Removable storage unit 188 represents a magnetic tape, optical disk, or other computer-readable storage medium that is read by and written to by removable storage drive 184. As will be appreciated, the removable storage unit 188 can represent a computer-readable medium having stored therein computer programs, sets of instructions, code, or data to be executed by processor 172.

In alternate embodiments, secondary memory 180 may include other means for allowing computer programs or other program instructions to be loaded into computer system 170. Such means may include, for example, a removable storage unit 192 and an interface 190. An example of such means may include a removable memory chip (e.g., EPROM, RAM, ROM, DRAM, EEPROM, flash memory devices, or other volatile or non-volatile memory devices) and associated socket, or other removable storage units 192 and interfaces 190, which allow instructions and data to be transferred from the removable storage unit 192 to computer system 190.

Computer system 170 may also include one or more communications interfaces, such as communications interface 194. Communications interface 194 allows software and data to be transferred between computer system 170 and external devices. Examples of communications interface 194 may include a modem, a network interface (e.g., an Ethernet card), a communications port, a PCMCIA slot and card, a wireless transmitter or card, etc. Software and data may be transferred via communications interface 194 in the form of signals 196, which may be electronic, electromagnetic, optical or other signals capable of being received by communications interface 194. These signals 196 are provided to communications interface 194 via a communications path (i.e., channel 198). Channel 198 carries signals 196 and may be implemented using wire or cable, fiber optics, an RF link, wireless transmissions, and other communications channels. In an embodiment, signals 196 comprise data packets sent to processor 172. Information representing processed packets can also be sent in the form of signals 196 from processor 172 through communications path 198.

The terms "storage device" and "storage medium" may refer to particular devices including, but not limited to, main memory 178, secondary memory 180, a hard disk installed in hard disk drive 182, and removable storage units 188 and 192. Further, the term "computer-readable medium" may refer to devices including, but not limited to, a hard disk installed in hard disk drive 182, any combination of main memory 178 and secondary memory 180, and removable storage units 188 and 192, which respectively provide computer programs and/or sets of instructions to processor 172 of computer system 170. Such computer programs and sets of instructions can be stored within one or more computer readable media. Additionally or alternatively, computer programs and sets of instructions may also be received via communications interface 194 and stored on the one or more computer readable media.

Such computer programs and instructions, when executed by processor 172, enable processor 172 to perform one or more of the computer-implemented methods described herein. Examples of program instructions include, for example, machine code, such as that code produced by a compiler, and files containing a high-level code that can be executed by processor 172 using an interpreter.

The computer-implemented methods described herein can also be implemented on a single processor of a computer system, such as processor 170 of system 170. In another embodiment, computer-implemented methods consistent with embodiments of the invention may be implemented using one or more processors within a single computer system, and additionally or alternatively, these computer-implemented methods may be implemented on one or more processors within separate computer systems linked via a network.

FIG. 2 depicts an exemplary test system 150, consistent with embodiments of the present disclosure. As illustrated in FIG. 2, test system 150 may include one or more testing objects 210, a testing engine 220, a report generator 230, and an automated troubleshooter 240. As will be appreciated, the above components of test system 150 may be implemented through any suitable combination of hardware, software, and/or firmware.

Testing objects 210 may include one or more independent objects. Each one of testing objects 210 may correspond to a different test performed by test system 150. Each one of testing objects 210 may specify requests desired to be sent to either opt-out system 130 or advertising system 140 from test system 150, to perform each particular test and/or the parameters desired to be set for the requests. Each one of testing objects 210 may also specify the streams desired to be received from either opt-out system 130 or advertising system 140 (e.g., how the streams can be identified) and the important content of the streams. Each one of testing objects 210 may also specify how the content may be analyzed and measured to determine an outcome for each particular test. Each one of testing objects 210 may be run through testing engine 220.

Testing engine 220 may change the settings of test system 150 before executing the tests corresponding to each one of testing objects 210. Testing engine 220 may change settings of test system 150 for each individual test, as needed. Testing engine 220 may also change settings of test system 150 before executing each one of the tests corresponding to each one of testing objects 210, execute each one of the tests, change settings of test system 150 to new settings, re-execute each one of the tests again, etc. Testing engine 220 may compile code needed to execute code corresponding to testing objects 210. Testing engine 220 may transmit a request corresponding to each one of testing objects 210 to either opt-out system 130 or advertising system 140. Testing engine 220 may also receive a stream corresponding to the request from opt-out system 130 or advertising system 140. Testing engine 220 may receive the stream and identify and analyze the contents of the stream. Testing engine 220 may also determine an outcome of each test.

Report generator 230 may compile a report based on a test outcome and/or troubleshooting information associated with each one of testing objects 210. The troubleshooting information may include an outcome for a test, information about a configuration of the tests, network trace information, function(s) that declared an error, various statistics, etc. Report generator 230 may determine who needs to be alerted about a particular compiled report. Report generator 230 may generate an email with the report. Report generator 230 may transmit the email with the compiled report to a single specific action group, multiple specific action groups, a privacy group, specific point of contact, etc.

Automated troubleshooter 240 may determine whether any failures or problems are discovered as a result of the tests (i.e., whether any of the outcomes are negative). If problems are detected, automated troubleshooter 240 may convert the troubleshooting information from one or more reports into machine-readable instructions. Automated troubleshooter 240 may compile the machine-readable instructions. Automated troubleshooter 240 may call configuration system 160 to act upon the troubleshooting information. Automated troubleshooter 240 may transmit the machine-readable instructions to configuration system 160.

Figure 3:
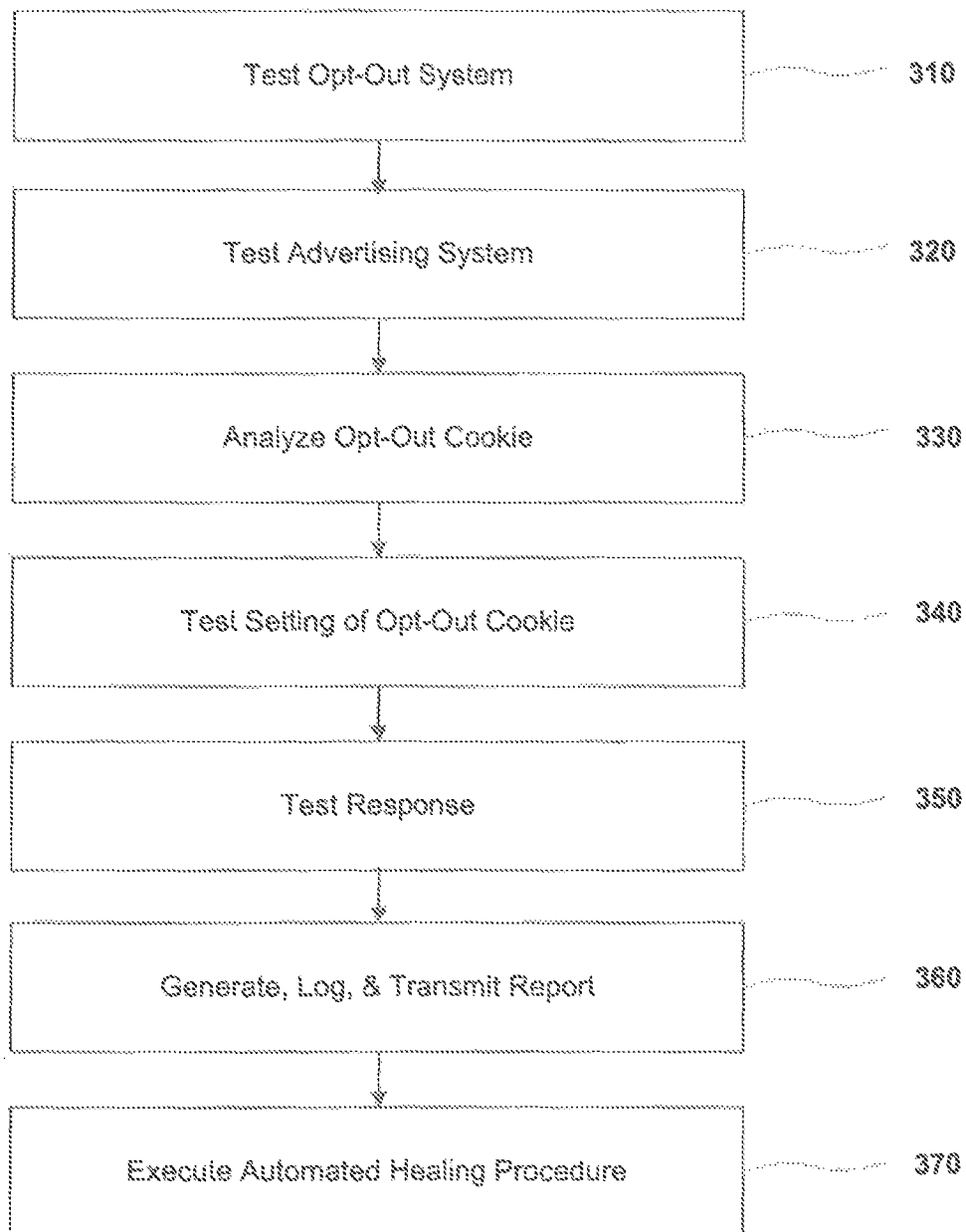
FIGS. 3 and 4 are flowcharts of exemplary methods for testing an opt-out system, consistent with embodiments of the present disclosure.

FIG. 3 illustrates a flowchart of exemplary method 300 for testing an opt-out system, consistent with embodiments of the present disclosure. Method 300 may be executed using the components of environment 100 illustrated in FIG. 1A. According to method 300, at step 310, test system 150 may test opt-out system 130. Test system 150 may test opt-out system 130 by conducting one or more different tests (e.g., a test to determine whether an opt-out website is functioning, a test to determine whether elements to opt-out are present on an opt-out website, a test to determine whether the elements respond properly, a test to determine whether opt-out system 130 interacts properly with test system 150, a test to determine whether opt-out system 130 interacts properly with each advertising system 140, etc.). As noted above, each one of the different tests may correspond to one of testing objects 210 depicted in FIG. 2.

At step 320, test system 150 may test advertising system 140. The tests for advertising system 140 may include determining whether advertising system 140 properly runs a script to create an opt-out cookie and sends the opt-out cookie to test system 150. At step 330, test system 150 may analyze the opt-out cookie. Test system 150 may analyze the opt-out cookie to determine that the opt-out cookie includes proper values, as described above.

At step 340, test system 150 may determine whether the opt-out cookie is properly set on test system 150. At step 350, test system 150 may test a response of advertising system 140 to make sure that the opt-out instructions are being adhered to by the advertising system 140. For example, test system may send a request (such as a request for an advertisement or other file) to test whether advertising system 140 properly responds to an opt-out cookie set on test system 150. In one embodiment, test system 150 transmits the opt-out cookie to advertising system 140 as part of an HTTP request. For example, test system 150 may transmit an instruction to set the opt-out cookie on a user's web browser, and the opt-out cookie may be transmitted to advertising system 140 in a subsequent web request (e.g., an HTTP or HTTPS request). Test system 150 then monitors an HTTP response from advertising system 140 to make sure, for example, that targeting or tracking cookies are not transmitted by advertising system 140.

At step 360, test system 150 may generate a report based on the outcome of one or more tests. As part of this step, test system 150 may log the report on a database of test system 150 or on some other internal or external storage device. Additionally, test system 150 may transmit the report through email or other communication means to appropriate recipients. As noted above, the appropriate recipients may include at least a specific action group. Step 360 may occur after each one of steps 310, 320, 330, 340, and 350, or after each one of the specific tests conducted within steps 310, 320, 330, 340, and 350.

Optionally, as part of the exemplary method of FIG. 3, a healing procedure may be performed to correct detected problems or failures. More specifically, at step 370, test system 150 may execute an automated healing procedure for opt-out system 130. Step 370 may include, for example, generating machine-readable instructions based on one or more reports, compiling the machine-readable instructions, and prompting configuration system 160 to correct any problems or failures identified in the one or more reports. Test system 150 may repeat one or more of steps 310, 320, 330, 340, 350, and 360, after each attempt by configuration system 160 to correct detected problems in step 370.

Figure 4:
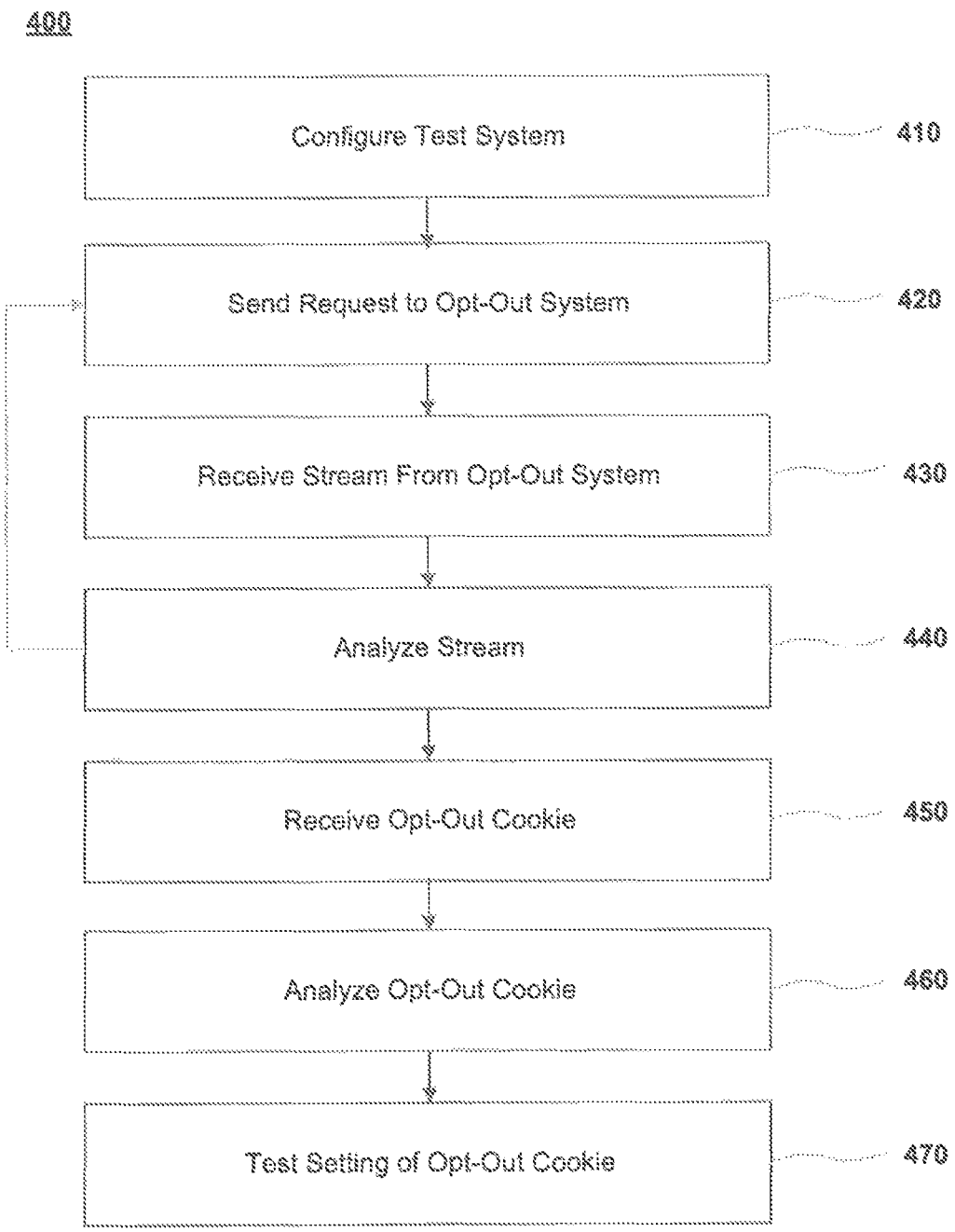

FIG. 4 depicts a flowchart of another exemplary method 400 for testing an opt-out system, consistent with embodiments of the present disclosure. Method 400 may be executed by test system 150 of FIG. 1A. According to method 400, at step 410, test system 150 may be configured before any tests are executed. Configuring test system 150 may include simulating or emulating particular environmental conditions on test system 150, as detailed above.

At step 420, test system 150 may send a request, corresponding to one of the tests for opt-out system 130. At step 430, test system 150 may receive a stream from opt-out system 130 in response to the request. Opt-out system 130 may send multiple streams in response to the request. At step 430, test system 150 may selectively determine which one or more streams to receive from opt-out system 130 based on the particular test that is being performed.

At step 440, test system 150 may analyze the received stream. Analyzing the stream, at step 440, may include selecting content from the stream desired to determine an outcome of a test, analyzing the selected content by, for example, measuring values of the contents, and determine an outcome of a test based on the measurements. After step 440 is complete, test system 150 may repeat steps 420, 430, and 440 for subsequent tests of opt-out system 130. Steps 420, 430, and 440 may be included in step 310 of method 300 depicted in FIG. 3.

At step 450, test system 150 may receive an opt-out cookie from advertising system 140. Before step 450, test system 150 may send a request to opt-out system 130 to opt-out of targeted advertising programs of particular advertising networks or advertising systems. The request may prompt each corresponding advertising system 140 to run a script to create the opt-out cookie and send the opt-out cookie to test system 150. As a result, at step 450, test system 150 may receive the opt-out cookie. At step 460, test system 150 may analyze the received opt-out cookie to determine whether values in the cookie are proper. When the received cookie is supposed to be an opt-out cookie (based on the request originally sent by test system 150 to opt-out system 130), test system 150 may analyze whether the values in the cookie are proper for an opt-out cookie.

At step 470, test system 150 may determine whether the received cookie is properly set on test system 150. After step 440 is complete, test system 150 may repeat steps 450, 460, and 470 for subsequent tests. For example, for an alternative test, test system 150 may prompt advertising system 140 to either send an opt-out cookie to test system 150 or request a normal cookie from test system 150. After all tests are complete, test system 150 may restart at step 410. At step 410, test system 150 may re-configure the settings of test system 150 to set new environmental conditions. After the new environmental conditions are set, test system 150 may repeat steps 420, 430, 440, 450, 460, and 470.

Figure 5:
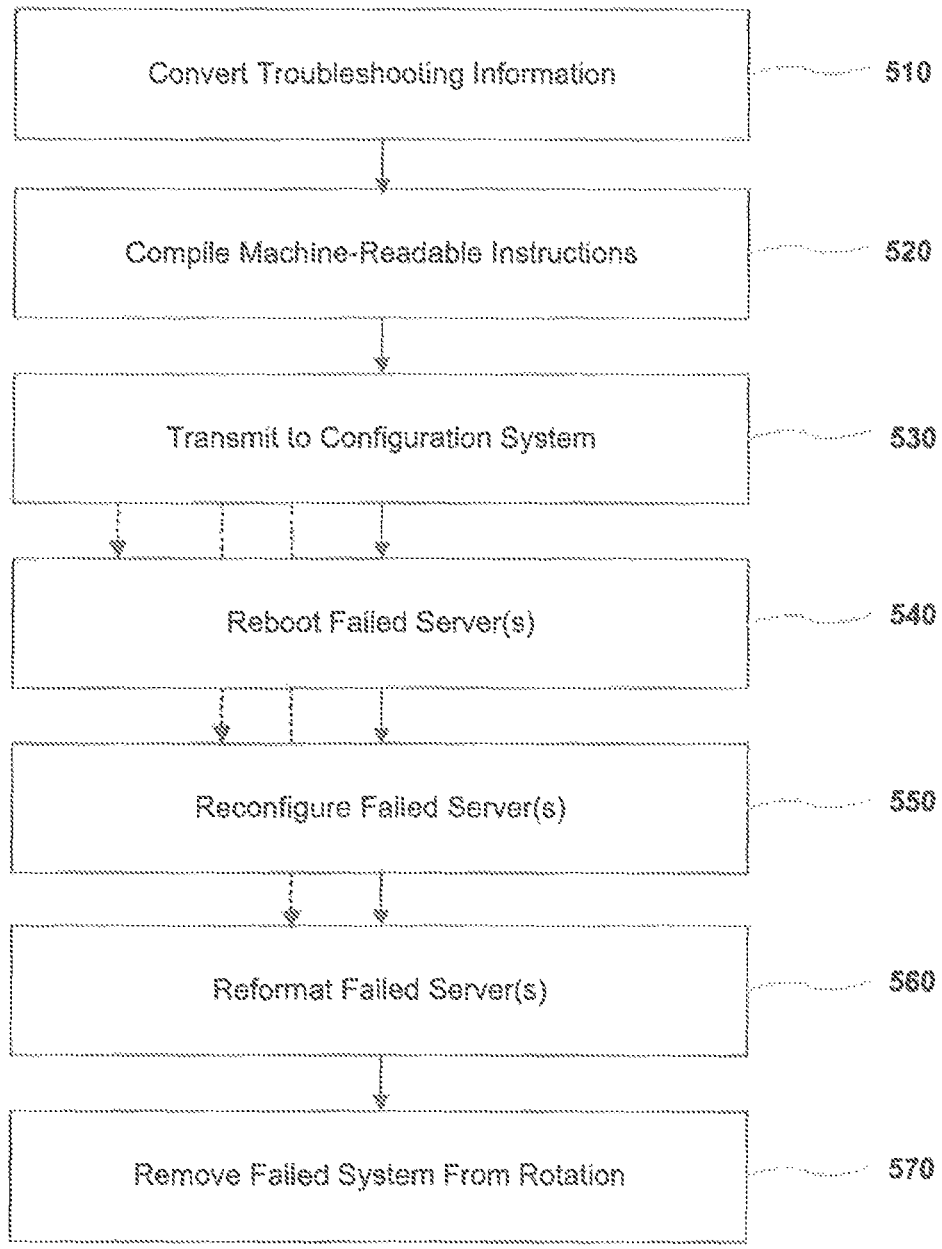
FIG. 5 is a flowchart of an exemplary method for performing an automated healing procedure in an opt-out system, consistent with embodiments of the present disclosure.

FIG. 5 is a flowchart of an exemplary method for performing an automated healing procedure after test system 150 determines that automated healing is necessary. Test system 150 may determine that automated healing is desired after conducting one or more automated tests of opt-out system 130 and discovering one or more failures/problems (i.e., one or more outcomes of the tests are negative). Method 500 may be executed by test system 150 and/or configuration system 160. According to method 500, at step 510, test system 150 may convert troubleshooting information, detailing a problem detected during one of the tests performed by test system 150, into machine-readable instructions. At step 520, test system 150 may compile the machine-readable instructions. At step 530, test system 150 may transmit the compiled machine-readable instructions to configuration system 160.

At step 540, configuration system 160 may reboot at least one server (or set of servers) of opt-out system 130 and advertising system 140. In the description of steps 540, 550, 560, and 570, opt-out system 130 and advertising system 140, may refer to only one individual physical server (or set of servers) that is responsible for the detected problem (the individual physical server(s) may be described by troubleshooting information). Alternatively, multiple individual physical systems may comprise opt-out system 130 and cookie system 140. Rebooting a server may include first shutting the server down and then powering the server back up. Instead of or in addition to step 540, configuration system 160 may optionally alert test system 150 to re-execute one or more tests of opt-out system 100. Configuration system 160 may alert test system 150 to only re-execute a subset of tests to determine whether a previously discovered problem has been corrected. If test system 150 determines, based on an outcome of a re-executed test, that a problem has not been corrected by rebooting at step 540, configuration system may optionally proceed with step 550 (after repeating steps 510, 520, and 530 and skipping step 540).

At step 550, configuration system 160 may optionally reconfigure at least one server (or set of servers) of opt-out system 130 and advertising system 140. Reconfiguring a server (or set of servers) may include pushing down the most up-to-date configuration the on the server(s). Reconfiguring may also include rebooting the server(s) after the most up-to-date configuration file is pushed down. After step 550, configuration system 160 may alert test system 150 to re-execute one or more tests of opt-out system 100. If test system 150 determines, based on an outcome of a re-executed test, that a problem has not been corrected by reconfiguring at step 550, configuration system may proceed with step 560 (after repeating steps 510, 520, and 530 and skipping steps 540 and 550).

At step 560, configuration system 160 may optionally reformat at least one server (or set of servers) of opt-out system 130 and advertising system 140. After step 560, configuration system 160 may alert test system 150 to re-execute one or more tests of opt-out system 100, if test system 150 determines, based on an outcome of a re-executed test, that a problem has not been corrected by reformatting at step 560, configuration system may proceed with step 570 (after repeating steps 510, 520, and 530 and skipping steps 540, 550, and 560).

At step 570, configuration system 160 may determine whether there is at least one other individual physical server that correctly performs the same role as the individual physical server responsible for a detected problem. For example, there may be at least one other server when opt-out system 130 is comprised of two individual physical servers, where one individual physical server is responsible for the problem and the other individual physical server correctly performs the same role. If there is at least one other server, configuration system 160 may remove the individual physical server responsible for the problem from rotation. Removing the individual physical server from rotation may not allow the server to act as part of opt-out system 130. If there is no other server that correctly performs the same purpose, automated healing may not be successful when the problem is not corrected after steps 540, 550, and 560. The problem may not be corrected until someone, for example, from the specific action group, resolves the problem in response to an alert through email (with a report).

FIG. 6 is a table 600 that illustrates exemplary testing of settings of an opt-out cookie on test system 150, consistent with embodiments of the present disclosure. Table 600 shows examples of what cookies may be present on test system 150 before the setting of an opt-out cookie as part of a test. Test system 150 may be configured to have no cookies (e.g., Present Cookie=None) for an advertising network associated with advertising system 140 before a test is conducted by test system 150. Test system 150 may receive an opt-out cookie corresponding to advertising system 140. Test system 150 may determine that the opt-out cookie is properly set on test system 150. Thereafter, test system 150 may send a request to a website associated with advertising system 140 to test that the opt-out cookie is properly set.

Test system 150 may also be configured to have a cookie corresponding to advertising system 140 before a test is conducted by test system 150. Test system 150 may receive an opt-out cookie corresponding to advertising system 140. Test system 150 may determine that test system 150 properly overrides the advertising system cookie with the opt-out cookie by deleting the advertising system cookie and setting the opt-out cookie.

Test system 150 may also be configured to already have an opt-out cookie for advertising system 140 set on test system 150 before a test is conducted by test system 150. Test system 150 may receive another opt-out cookie for advertising system 140. Test system 150 may determine that test system 150 already has an existing opt-out cookie, that the opt-out cookie is not overridden, that test system 150 does not need the newly received opt-out cookie, and that the existing opt-out cookie continues to be properly set.

Figure 7:
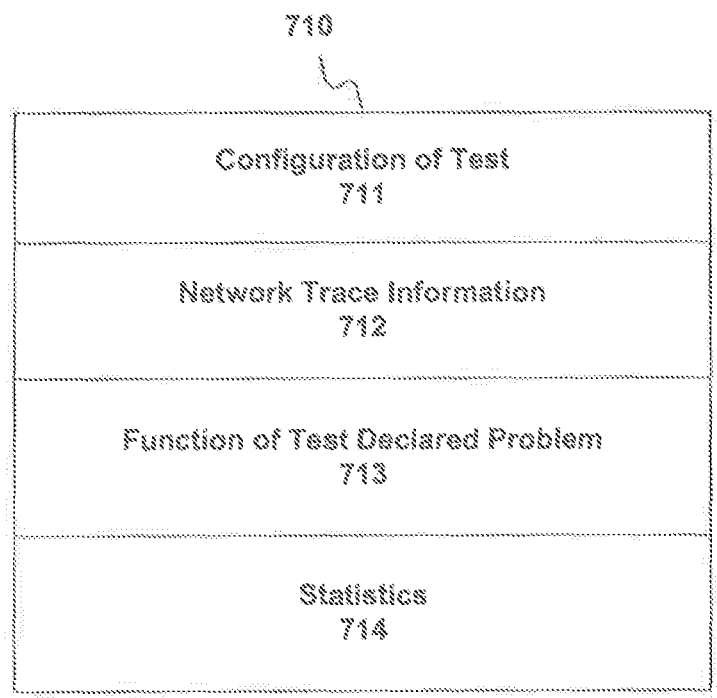
FIG. 7 illustrates an exemplary tabular representation of troubleshooting information generated based on tests performed by a test system, consistent with embodiments of the present disclosure.

FIG. 7 is a table depicting an example of troubleshooting information 710 for tests performed by test system 150. Troubleshooting information 710 may be compiled into a report by test system 150. As illustrated in FIG. 7, troubleshooting information 710 may include, for example, a configuration of a test 711, network trace information 712, an identification of a function of the test that determined a problem 713, and relevant statistics 714. Configuration of test 711 may include one or more of the following: an identification of the test during which a problem was identified, settings of test system 150 at a time when the test was executed, cookies on the test system 150 at the time when the test was executed, etc. Network trace information 712 may include a detailed history of the test: what information was transmitted from test system 150, to what servers) the information was transmitted from test system 150, what information was transmitted to test system 150, from what server(s) the information was transmitted to test system 150, how any information was transmitted, etc. Examples of network trace information 712 may include information about requests, streams, and transmission information related to the test. Network trace information 712 may include physical identifications of the different servers and network routes used during a test. Relevant statistics 714 may include other information about the execution of the test, history of the execution of the test in the past, etc.

Using the exemplary embodiments outlined above, a test system (e.g., test system 150 of FIG. 1A) may monitor a compliance of an opt-out system (e.g., opt-out system 130 of FIG. 1A) with one or more user-specified opt-out preferences, and further, with one or more requirements imposed on web sites and advertising systems. However, the non-compliance of opt-out systems with various opt-out preferences and imposed requirements no longer represent the sole threats to an individual's privacy and security within the World Wide Web. Thus, as described below in the exemplary embodiment of FIG. 8, additional systems and methods may be employed to ensure the privacy and security of an individual throughout that individual's interaction with the Internet.

Figure 8:
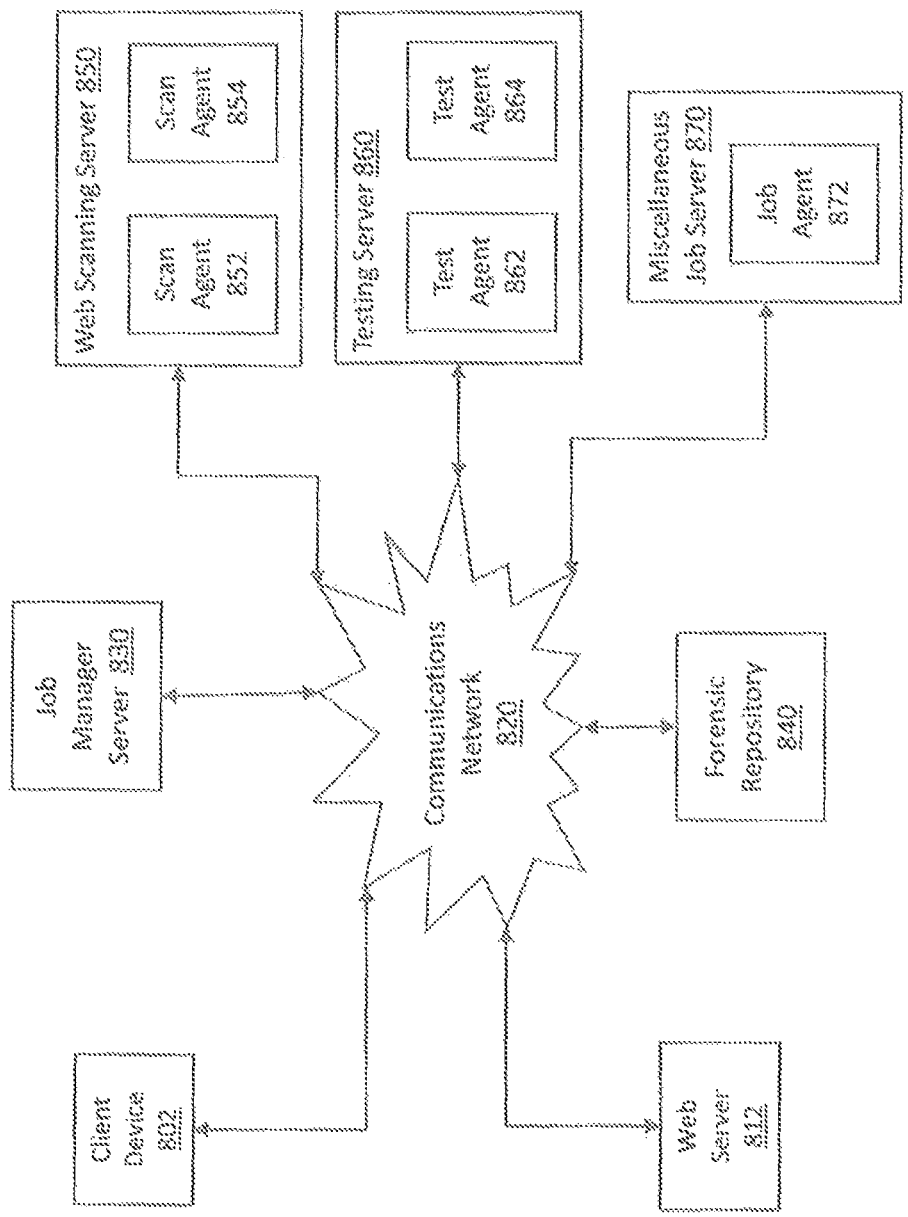
FIG. 8 is a diagram of an additional exemplary computing environment for practicing embodiments consistent with the present disclosure

FIG. 8 illustrates an exemplary web scanning system 800 for monitoring the compliance of web pages and graphical user interfaces with online privacy and security policies, consistent with embodiments of the present disclosure. For example, system 800 may provide a configurable batch file-based instruction interface that allows for execution of both ad-hoc and fully automated browser scripts, and that leverages an executable web browser (e.g., Microsoft Internet Explorer, Apple Safari, Google Chrome, or Mozilla Firefox) to accurately simulate an individual's experience with one or more web sites (i.e., as opposed to simulated HTTP requests). Further, system 800 may facilitate the collection and storage of granular forensic data, which may be leveraged by system 800 to identify and monitor privacy and security issues that impact an individual's interaction with the World Wide Web.

As shown in FIG. 8, system 800 includes a client device 802, a web server 812, a job manager server 830, a forensic repository 840, a web scanning server 850, a testing server 860, and a miscellaneous job server 870 interconnected via a communications network 820. In one embodiment, client device 802, web server 812, job manager server 830, forensic repository 840, web scanning server 850, testing server 860, and miscellaneous job server 870 may represent any type of computer system capable of performing communication protocol processing, such as those described above in reference to FIG. 1B.

Further, as depicted in FIG. 8, web scanning server 850 may include or be associated with corresponding agents 852 and 854, testing server 860 may include or be associated with corresponding agents 862 and 864, and miscellaneous job server 870 may include or be associated with agent 872. In an embodiment, one or more of agents 852, 854, 862, 864, and 872 may include processor-based devices (e.g., as described in FIG. 1B) in communication with corresponding ones of server 850, 860, and 870. In additional embodiment, one or more of agents 852, 854, 862, 864, and 872 may represent "virtual machines," which may be emulated through an execution of software by corresponding ones of servers 850, 860, and 870.

Client device 802 can include, but is not limited to, a personal computer, a laptop computer, a notebook computer, a hand-held computer, a personal digital assistant, a portable navigation device, a mobile phone, a smart phone, and any additional or alternate computing device apparent to a person of ordinary skill in the art. Further, although system 800 includes a single client device and a single web server in communication with network 820, it will be understood from the present disclosure that system 800 may include any number of additional number of mobile or stationary client devices, any number of additional web servers, and any additional number of computers, systems, or servers.

Communications network 820 may represent any form or medium of digital data communication. Examples of communication network 820 include a local area network ("LAN"), a wireless LAN, e.g., a "WiFi" network, a wireless Metropolitan Area Network (MAN) that connects multiple wireless LANs, a wide area network ("WAN"), e.g., the Internet, and a dial-up connection (e.g., using a V.90 protocol or a V.92 protocol). In the embodiments described herein, the Internet may include any publicly-accessible network or networks interconnected via one or more communication protocols, including, but not limited to, hypertext transfer protocol (HTTP) and transmission control protocol/internet protocol (TCP/IP). Moreover, communications network 130 may also include one or more mobile device networks, such as a GSM network or a PCS network, that allow mobile devices, such as client device 802, to send and receive data via applicable communications protocols, including those described above.

In one embodiment, job manager server 830, web scanning server 850, testing server 860, and miscellaneous job server 870 may include a general purpose computer (e.g., a personal computer, network computer, server, or mainframe computer) having one or more processors that may be selectively activated or reconfigured by a computer program. In additional embodiments, one or more of job manager server 830, web scanning server 850, testing server 860, and miscellaneous job server 870 may be incorporated as corresponding nodes in a distributed network, and additionally or alternatively, as corresponding networked servers in a cloud-computing environment. Furthermore, job manager server 830, web scanning server 850, testing server 860, and miscellaneous job server 870 may communicate via network 820 with one or more additional servers (not shown), which facilitate the distribution of processes for parallel execution by the additional servers.

Web server 812 may also include a general purpose computer (e.g., a personal computer, network computer, server, or mainframe computer) having one or more processors that may be selectively activated or reconfigured by a computer program. In such an embodiment, web server 812 may be configured to host one or more websites associated with an advertiser and/or content provider network (e.g., AOL). Further, upon request from a client device (e.g., client device 802), web server 812 may be configured to provide information associated with a requested web page over communications network 820 to client device 802, which may render the received information and present the web page to a user of client device 802. Additionally, web server 812 may be incorporated as a corresponding node in a distributed network, and additionally or alternatively, as a corresponding networked server in a cloud-computing environment. Furthermore, web server 812 may communicate via network 130 with one or more additional servers (not shown), which may facilitate the distribution of processes for parallel execution by the additional servers.

Forensic repository 840 may be incorporated into a single hardware unit, for example, a single computer or a single server. In such an embodiment, forensic repository 840 may be incorporated into, or stored within, a corresponding storage medium or storage device, as described above with reference to FIG. 1B. However, forensic repository 840 is not limited to such configurations, and, in additional embodiments, forensic repository 840 may reside on any additional or alternate computer or server accessible to job manager server 830, web scanning server 850, testing server 860, and miscellaneous job server 870.

In one embodiment, job manager server 830 may obtain, from various input sources, requests that one of web scanning server 850, testing server 860, and miscellaneous job server 870 perform tasks (i.e., "jobs"). These tasks may include, but are not limited to, configurable scans of websites, groups of websites, or graphical user interfaces (e.g., accessible using a mobile device) to collect forensic data, configurable analyses of the collected forensic data to gauge compliance with various U.S. and international privacy and security regulations, and miscellaneous tasks related to the creation and maintenance of domain and cookie registries.

Job manager server 830 may also receive polling information from one or more of web scanning server 850, testing server 860, and miscellaneous job server 870 indicating that agents of these servers are available to perform corresponding tasks. In response to polling information, job manager server may match a requested task with a corresponding one of web scanning server 850, testing server 860, and miscellaneous job server 870 and, as described below in reference to FIG. 9, may delegate the performance of the requested task to the corresponding one of web scanning server 850, testing server 860, and miscellaneous job server 870 for performance.

Figure 9:
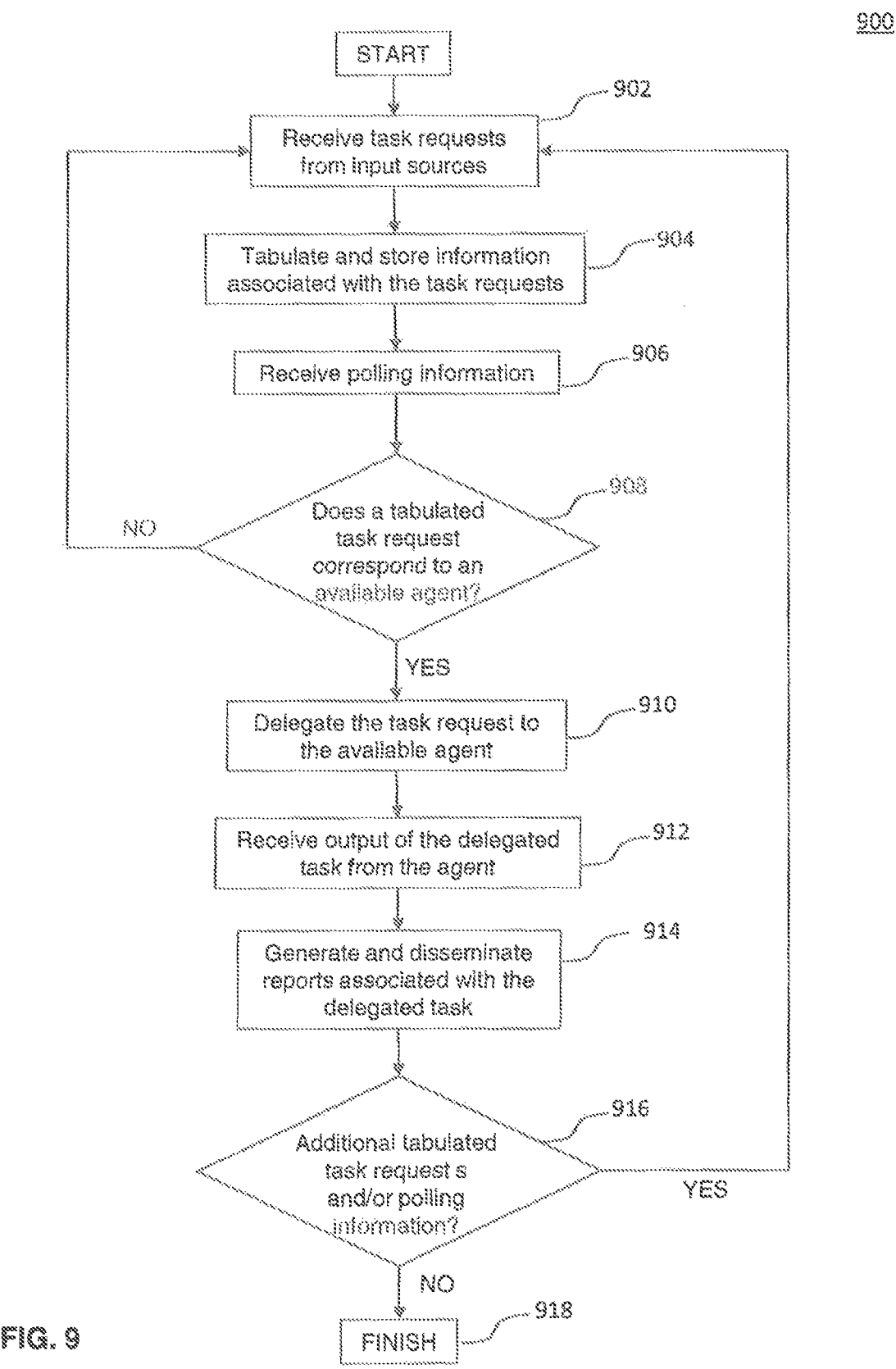
FIG. 9 is a flowchart of an exemplary method for assessing compliance of websites and graphical user interfaces with privacy and security regulations, consistent with embodiments of the present disclosure.

FIG. 9 is a flow chart illustrating an exemplary method 900 for assessing compliance of websites and graphical user interfaces with privacy and security regulations set forth by the U.S. government, by foreign governments, and/or by various self-regulatory organizations, according to embodiments consistent with the present disclosure. Method 900 may enable a job manager server (e.g., job manager server 830 of FIG. 8) to receive requests for tasks from various input sources, delegate the performance of these requested tasks to available server agents, and generate reports describing outcomes of the requested tasks. In such embodiments, the reporting information generated by job manager server 830 may indicate a compliance of various websites and graphical user interfaces with one or more online privacy and security regulations, and further, with one or more consent mechanisms.

In step 902, job manager server 830 may obtain, from an input source, a request that one of web scanning server 850, testing server 860, and miscellaneous job server 870 perform a corresponding task. In such embodiments, the received task request may include, but is not limited to, information identifying the input source, information identifying the requested task (e.g., a scan, an analysis, or a miscellaneous job), scheduling information associated with the requested task (e.g., a specific time period during which the task must be completed, a specific time at which the requested task may be initiated, or a schedule for repeating the requested task), a time stamp associated with the requested task, and/or any additional or alternate information required by job manager server 830 to delegate performance of the task.

By way of example, the task request may represent a request to collect forensic data indicative of privacy and security policies implemented by a website, a group of websites, or a graphical user interface (e.g., web-based or mobile interface) associated with an advertiser, a content provider, or an electronic retailers. Further, the request may identify the task as a scan operation and further, may identify the specific website, group of websites, and graphical user interface that collectively form the object of the scan. For example, the request may specify the object of the scan using one or more IP addresses, a domain name, or one or more hypertext transfer protocol (HTTP) addresses.

Additionally or alternatively, the task request may represent a request to analyze forensic data associated with an advertiser, a content provider, or an electronic retailers to test the compliance of these entities with U.S., foreign, and/or self-regulatory security and privacy policies. For example, the forensic data may correspond to a website, a group of websites, or a graphical user interface (e.g., web-based or mobile interface) scanned by one of more of agents 852 and 854 of web scanning server 850.

The task request may identify the task as an analytical operation, and further may identify the specific website, group of websites, graphical user interface whose collected forensic data is the subject of the analytical operation. As described above, the request may specify one or more IP addresses, a domain name, and/or one or more hypertext transfer protocol (HTTP) addresses associated with the specific website, group of websites, or graphical user interfaces. Further, the request may also specify a particular entity, individual, or device whose collected forensic data will be subject to analysis (e.g., using a title, keyword, a user name, or a MAC address).

The task request may also represent a request to perform one or more miscellaneous tasks, such a updates to registry information and to domain or entity catalogs. In such an embodiment, the request may specify information sufficient to enable job manager server 830 to identify the requested miscellaneous job and subsequently delegate the requested miscellaneous job to an appropriate agent, as described below.

Referring back to step 902, the input source may include a user having an appropriate level of access to job manager server 830 (e.g., an administrator using client device 802), and the request may be transmitted via email to an inbox associated with job manager server 830, via text message to a number associated with job manager server 830, or via a graphical user interface associated job manager server 830 (e.g., a corresponding web page). In such an embodiment, the user may be able to configure the requested task and specify, among other things, the object of the task (e.g., websites or graphical user interfaces), the type of the task, and a schedule associated with the task.

The disclosed embodiments are, however, not limited to such exemplary input sources, and in additional embodiments, job manager server 830 may obtain information identifying a requested task from a predefined list of tasks stored locally at job manager server 830 (e.g., within a corresponding storage device, as described above in reference to FIG. 1B). For example, the predefined task list may include information identifying tasks to be performed by one or more of web scanning server 850, testing server 860, and miscellaneous job server 870 at predetermined or regular intervals, and the predefined task list may be established by an administrator that accesses job manager server 830 through a corresponding graphical user interface, as described above.

The input source may also correspond to a web server in communication with job management server 830 across communications network 820 (e.g., web server 812 of FIG. 8), and the request may be received through a corresponding application programming interface (API). In such an embodiment, the task request may be generated programmatically by web server 812 in response to the detection of malware or the detection of third-party attack.

In step 904, job manager server 830 may store the received task request in tabular form for delegation to corresponding agents of web scanning server 850, testing server 860, and miscellaneous job server 870. For example, for each of the received task requests, the tabulated data may include, but is not limited to, configuration information identifying an input source (e.g., an identifier of a user or an identifier of a corresponding device), the requested task, a timing or schedule associated with the requested task (e.g., performed once at 3:00 p.m. EST on Feb. 9, 2013, or performed regularly at hourly intervals), and an object of the requested task (e.g., information identifying Internet Protocol (IP) addresses of websites to be scanned or information identifying specific portions of stored forensic data for processing).

In step 906, job manager server 830 may receive, from web scanning server 850, testing server 860, and miscellaneous job server 870, polling information indicative of an availability of corresponding agents to perform tasks. Upon receipt of the polling information, job manager server 830 may access the stored task requests, and may determine in step 908 whether one of the tabulated task requests may be fulfilled by an available agent of one of the web scanning server 850, testing server 860, and miscellaneous job server 870.

If job manager server 830 determines in step 908 that no available agents are capable of fulfilling the tabulated task requests, the method 900 may pass back to step 902. In such an embodiment, job manager server 830 may continue to receive task requests from input sources and polling information from available agents, and may continue to match available agents against requested tasks, as outlined above.

Alternatively, if job manager server 830 determines in step 908 that one of the task requests may be fulfilled by an available agent, then job manager server 830 delegates the performance of the task request to the available agent in step 910. In such an embodiment, job manager server 830 may obtain configuration information associated with the task request (e.g., information identifying the task and information identifying the object of the task), and may transmit the configuration information to the available agent in step 910 over communications network 820.

By way of example, job manager server 830 may receive a request to scan a group of websites hosted by web server 812 in step 902, and may receive polling information in step 906 indicating that an agent of web scanning server 850 (e.g., agent 852 of web scanning server 850) is available for scanning purposes. In such an embodiment, job manager server 830 may match the scan request to with available agent 852 in step 908, and may transmit configuration information associated with the scan request to agent 852 for processing in step 910, as described below in reference to FIG. 10.

Additionally or alternatively, job manager server 830 may receive in step 902 a request to assess the compliance of a group of websites hosted by web server 812 with U.S. state and federal privacy regulations. Job manager server 830 may also receive polling information in step 906 indicating that an agent of testing server 860 (e.g., agent 862 of FIG. 8) is available for to analyze portions of forensic data corresponding to the group of websites. In such an embodiment, job manager server 830 may match the received task request to with available agent 862 in step 908, and may transmit configuration information associated with the request to agent 862 for processing in step 910, as described below in reference to FIG. 11.

Further, for example, job manager server 830 may receive in step 902 a request to complete a miscellaneous job (e.g., creating, updating, and maintaining a catalog of entities and domains), and may receive polling information in step 906 indicating that an agent of miscellaneous job server 870 (e.g., agent 872 of web miscellaneous job server 870) is available to perform miscellaneous jobs. In such an embodiment, job manager server 830 may match the received miscellaneous job request to with available agent 872 in step 908, and may transmit configuration information associated with the miscellaneous job request to agent 872 for processing in step 910.

Referring back to FIG. 9, job manager server 830 may receive output data associated with the performance of the delegated task from the agent in step 912. For example, the output information received in step 912 may include, but is not limited to, a confirmation of the performance of the scan operation by agent 852, a portion of the forensic data collected by agent 852 during the scan operation, a confirmation of the performance of the analytical operation by agent 862, a portion of the results of the analytical operation performed by agent 862, and a confirmation of the performance of the miscellaneous job performed by agent 872.

In step 914, job manager server 830 may generate a report upon completion of the delegated task. In an embodiment, the report may include one or more elements of the output data received by job manager server 830 in step 912. Further, for an analytical operation performed by agent 862, the generated report may indicate a level of compliance privacy regulations set forth by U.S. authorities, foreign governments, and self-regulatory organizations. In an embodiment, job manager server 830 may transmit the generated report to the input source associated with the delegated task, may disseminate the generated report to multiple parties included within an email list, and additionally or alternatively, may publish the generated report on a web page (e.g., on an intranet).

Job server 830 then determines in step 916 whether additional tabulated task requests and/or additional polling information require matching, fulfillment, and delegation. If such additional tabulated task requests and polling information exist, then exemplary method 900 passes back to step 902, and job manager server 830 continues to receive task requests, match task requests to available agents based on received polling information, and delegate the matched task requests to the available agents. In such embodiments, job manager server may continuously receive task requests from input sources, may continuously receive polling information from web scanning server 850, testing server 860, and miscellaneous job server 870, and may continuously delegate received tasks requests with corresponding available agents of web scanning server 850, testing server 860, and miscellaneous job server 870. If, however, job manager server 830 determines in step 916 that no additional tabulated task requests and polling information exist, then exemplary method 900 is complete in step 918.

In the embodiments described above, job manager server 830 may delegate a request to collect forensic data associated with an advertiser, a content provider, or an electronic retailer to an agent of web scanning server 850 (e.g., one or more of agents 852 and 854). For example, job manager server 830 may received a request to scan a group of websites hosted by web server 812, and may subsequently receive polling information indicating that agent 852 of web scanning server 850 is available for scanning purposes. In such an embodiment, job manager server 830 may dispatch configuration information for the received scan request to web scanning server 850 for execution by the agent 852, as described below in reference to FIG. 10.

Figure 10:
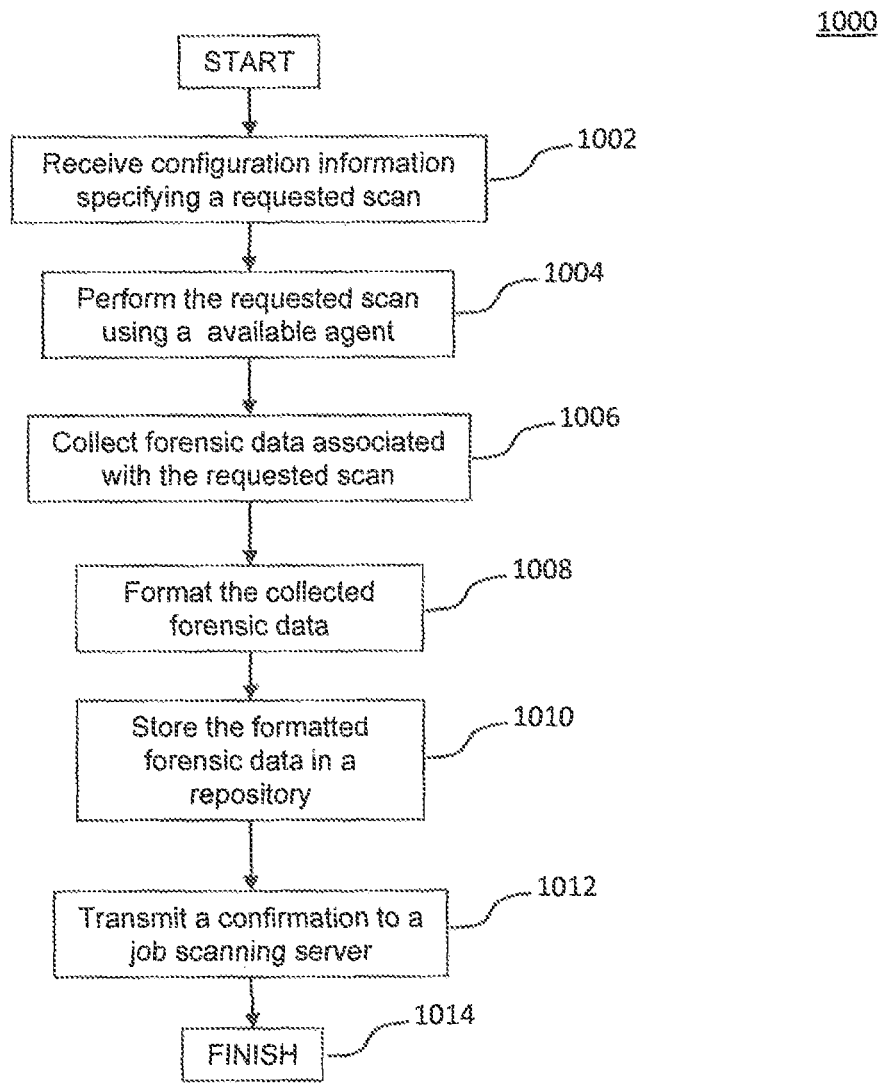
FIG. 10 is a flowchart of an exemplary method for generating forensic data associated with one or more websites and graphical user interfaces, consistent with embodiments of the present disclosure.

FIG. 10 is a flow chart illustrating an exemplary method 1000 for generating forensic data associated with a website, a group of websites, or one or more graphical user interfaces, according to embodiments consistent with the present disclosure. Method 1000 may enable an available agent of a web scanning server (e.g., agent 852 of web scanning server 850 of FIG. 8) to implement a requested scan of a website, a group of websites, or a graphical user interface (e.g., web-based or mobile interface) associated with an advertiser, a content provider, or an electronic retailer, to generate forensic data associated with the websites or graphical user interfaces, and to store the generate forensic data within a portion of a forensic repository (e.g., forensic repository 840 of FIG. 8).

For example, as described above, web scanning server 850 may transmit polling information across communications network 820 to job manager server 830 indicating that agent 852 is available to perform a scan. In response to the transmission of the polling data, in step 1002, web scanning server 850 may receive configuration information from job manager server 830 specifying the requested scan and identifying an object of the scan, e.g., a website, a group of websites, or one or more graphical user interfaces (e.g., web-based or mobile interface). For example, the received configuration information may identify the websites and graphical user interfaces by Internet Protocol (IP) address, by domain name, by Hypertext Transfer Protocol (HTTP) address, or by any additional or alternate identifier apparent to one of skill in the art and appropriate to web scanning server 850.

In step 1004, and upon receipt of the configuration information, agent 852 of web scanning server 850 scans the requested object and generates corresponding forensic data. For example, agent 852 may generate an automated browser interface to access the requested website, group of websites, or graphical user interfaces, and in step 1004, may subsequently scan the accessed website, group of websites, or graphical user interfaces to identify forensic data. In such embodiments, agent 852 may represent a web crawler executed by web scanning server 850 to scan the requested website, group of websites, or graphical user interfaces.

In step 1006, web scanning server 850 may collected the forensic data generated by agent 852 during the scan of the requested website, group of websites, or graphical user interfaces. For example, the collected forensic data may include, but is not limited to, cache and script files, data streams generated by and/or transmitted to the accessed website, group of websites, or graphical user interfaces, locally-stored objects (LSOs) associated with the accessed website, group of websites, or graphical user interfaces (e.g., cookies, Flash cookies, HTML5 storage, Silverlight storage, advanced browser caching information, device fingerprinting, history sniffing, and/or other instances of nonstandard tracking not associated with a privacy policy), screenshots of rendered content, information indicative of system failure, and information indicative of unexpected changes or unauthorized access to an integrity of a file system (e.g., due to malicious content).

Further, in such embodiments, the forensic data may also include information that web scanning server 850 determines would enable a third party to identify a user of the accessed websites or graphical user interfaces. Such identifying information may include, but is not limited to, account identifiers associated with the user (e.g., Facebook and social network identifiers, auction site identifiers, identifiers associated with content providers, and identifiers associated with electronic commerce portals), email addresses, photographs, mailing or physical addresses (e.g., street, city, state, and zip code), fine geo-location information (e.g., latitude and longitude), IP addresses (e.g., Internet and intranet addresses, IPv4 addresses, and IPv6 addresses), mobile device identifiers, Media Access Control (MAC) addresses associated with the user, birthday information, gender, marital status, phone number, first and last name, MD5 hashes and base64 encoding of identifiers, an education and/or employment history, a shopping/purchase history or information, and a search history. Further, in additional embodiments, the collected forensic data may identify instances of data leakage where account data is passed to third parties (i.e. either deliberately via explicit HTTP call or redirect, or inadvertently via exposure in the HTTP referrer).

The forensic data collected in step 1006 may also identify data that web scanning server 850 determines would be sensitive and thus protected from disclosure by a user. Such sensitive information may include, but is not limited to, financial identifiers and account numbers of the user, the user's social security number, medical conditions of the user, the user's religious affiliation, the user's sexual preference, and any password or passwords that enable the user to log into the accessed website or group of websites.

Furthermore, while scanning the requested websites or graphical user interfaces in step 1004, agent 852 may determine whether advertising identifiers share storage or domain space with personal information or alternatively, are associated with a common storage mechanism (e.g. cookies or HTML5). Furthermore, agent 852 may detect zombie cookies (e.g., PII and non-PII tracking cookies that respawn) and/or cross-device tracking techniques by maintaining historical record of tracking identifiers. For example, after clearing tracking state, agent 852 may detect if identifiers reappear after interacting with the same sites or parties on the same device (i.e., zombie cookies) or different devices (i.e., cross-device tracking techniques).

Further, in an additional embodiment, agent 852 may emulate a mobile device and scan portions of a graphical user interface provided by an online application store in step 1004 (e.g., iTunes, the Apple App Store, and Google Play). In such an embodiment, agent 852 may detect a presence or a function of the privacy policy in the applications store, and to determine that the privacy policy is accessible prior to downloading and installing an application. Further, while emulating a mobile device, agent 852 may collect identifiers and personal data (e.g., a device identifier, personally identifiable information (PII), address book information, text messages, photos, phone calls, fine geo-location information) for parties associated with the application and/or the mobile device in step 1006.

Referring back to FIG. 10, web scanning server 850 may format the collected forensic information in step 1008, and may store the formatted forensic data within a forensic repository (e.g., forensic repository 840 of FIG. 8) in step 1010. For example, in step 1008, web scanning server 850 may format the collected forensic data as string of raw text, in tab-delimited format, in comma-delimited format, Lightweight Directory Access Protocol (LDAP) format, or in any additional or alternate format consistent with forensic repository 840. In step 1012, web scanning server 850 may transmit a confirmation of the completion of the requested scan across communications network 820, and exemplary method 1000 is complete in step 1014.

As described above in reference to FIG. 9, and upon receipt of the confirmation from web scanning server 850, job manager server 830 may generate a report indicating the completion of the requested scan, and additionally or alternatively, a portion of the forensic data associated with the requested scan. In such embodiments, the generated report may be transmitted to the input source, and additionally or alternatively, may be disseminated to multiple parties associated with an email list or published on a web page (e.g., within an intranet).

In the embodiments described above, job manager server 830 may also delegate a request to perform an analytical operation on forensic data associated with a website, a group of websites, or a graphical user interface (e.g., web-based or mobile interface) to an available agent of testing server 860 (e.g., agent 862 of FIG. 8). For example, job manager server 830 may receive a request from an input source to perform an analytical operation on the forensic data associated with an advertiser, a content provider, or an electronic retailer, and may receive polling information indicating that agent 862 is available to analyze the forensic data. Job manager server 830 may then dispatch configuration information identifying the received request for analysis to testing server 860 for execution by agent 862, as described below in reference to FIG. 11.

Figure 11:
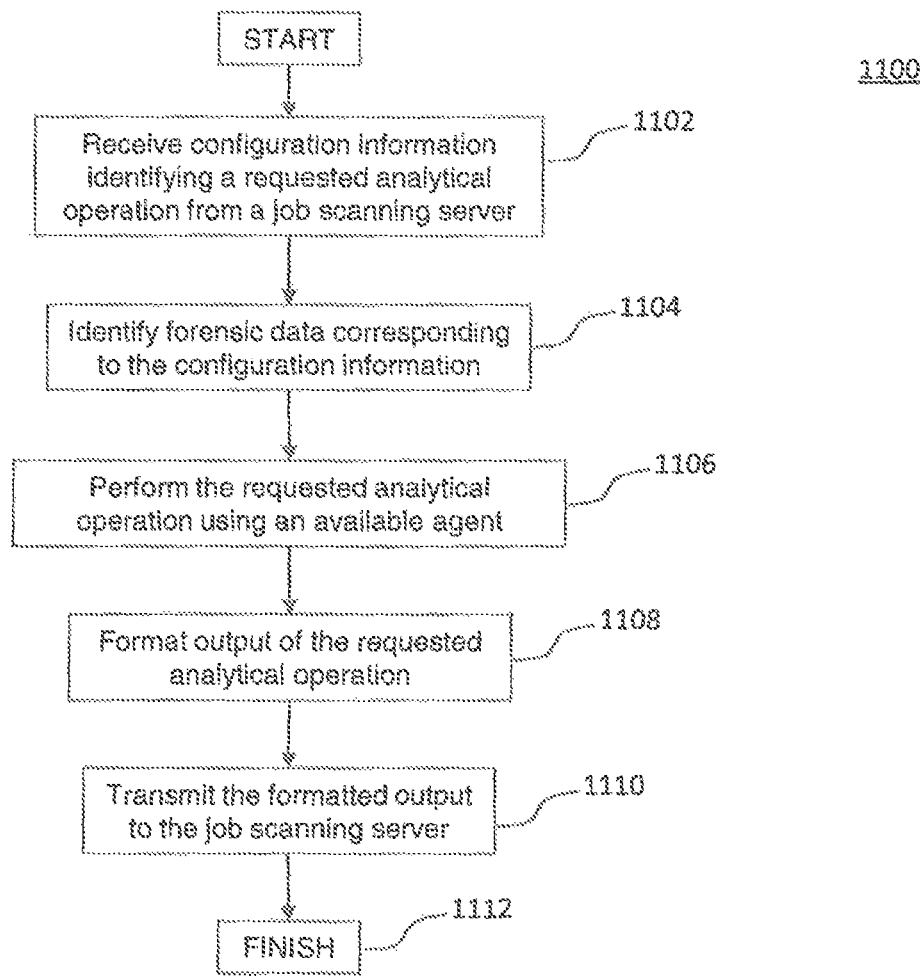
FIG. 11 is a flowchart of an exemplary method for performing analytical operations on forensic data associated with websites and graphical user interfaces, consistent with embodiments of the present disclosure.

FIG. 11 is a flow chart illustrating an exemplary method 1100 for analyzing forensic data associated with one or more websites and graphical user interfaces to gauge compliance with online privacy and security regulations, according to embodiments consistent with the present disclosure. Method 1100 may enable an available agent of a testing server (e.g., agent 862 of web scanning server 860 of FIG. 8) to access forensic data stored within a forensic repository (e.g., forensic repository 840 of FIG. 8) and perform one or more analytical operations on the accessed forensic data.

For example, as described above, testing server 860 may transmit polling information across communications network 820 to job manager server 830 indicating that agent 862 is available to conduct tests. In response to the transmission of the polling data, in step 1102, testing server 860 may receive configuration information identifying a requested analytical operation to be performed on forensic data associated with a website (e.g., "www.aol.com"), a group of websites (e.g., all websites associated with the AOL domain), a graphical user interface (e.g., web-based or mobile), an individual user (e.g., information associated with "user1@aol.com"), a specific user device (e.g., information associated with a corresponding MAC address), combinations thereof, or any additional or alternate portion of the stored forensic data accessible to and identifiable by agent 862.

In step 1104, and upon receipt of the information identifying the analytical operation, agent 862 accesses forensic repository 840 and identifies the forensic data associated with the requested analytical operation. In an embodiment, and as described above, the forensic data may be identified and isolated within forensic repository 840 using any portion of the confirmation information associated with the requested analytical operation, e.g., information identifying a website or group of websites, an individual user, or a specific user device.

In step 1106, agent 864 may perform the requested analytical operation on the identified and isolated forensic data. In an embodiment, the requested analytical operation may process the forensic data associated with one or more websites and graphical user interfaces to determine a level of compliance with one or more of the following:

(i) privacy protections afforded by U.S. states (e.g., California requirements that that web sites and applications that actively collect user data must provide a link to a privacy policy that explains how the entity uses such data);

(ii) privacy protections afforded by the U.S. federal government (e.g., the Children's Online Privacy Protection Act (COPPA), which prohibits websites intended for children under thirteen from collecting data without parental consent;

(iii) privacy protections afforded by the European Union (e.g., requirements that web sites and third parties obtain consent before establishing cookies and/or collecting user data for "secondary" purposes, and disclose in their privacy policies what information is collected and for what purpose;

(iv) consent mechanisms required by the European Union and other governmental and non-governmental entities (e.g., requirements that a website obtain express user consent for tracking before the user interacts with the web site);

(v) privacy protections outlined within the Code of Ethics of the Digital Analytics Association (DAA) (e.g., the DAA requires serving "Ad Choices" icons on or around compliant advertisements);

(vi) privacy protections afforded by standards organizations (e.g., the "Do Not Track" standards set forth within the "Tracking Preference Expression (DNT)" specification proposed by the World Wide Web Consortium (W3C)); and (vii) the behavioral advertising opt-out function required by self-regulatory organizations (e.g., the DAA, the Network Advertising Initiative (NAI), and the Internet Advertising Bureau (IAB)).

Further, in step 1106, agent 862 may also identify potential vulnerabilities in the privacy and security afforded by the websites and graphical user interfaces based on a general tracking hygiene within the identified forensic data. For example, in step 1006, agent 862 may process the forensic data to identify non-standard tracking techniques (e.g., HTML5 storage, e-tags, Flash cookies, Silverlight, web cache, history sniffing, fingerprinting) not currently disclosed by the privacy policy of the website or graphical user interface; to detect instances of data leakage where account data is passed to third parties; to detect the presence of personal account information or sensitive in cookies or local storage; and to detect if advertising identifiers share storage space, domain space, or storage mechanisms with personal information, or are present in the same storage method. Agent 862 may, in such embodiments, also detect zombie cookies, cross-device mapping techniques, non-HTTP traffic/requests (e.g., UDP, non-port 80 TCP), and/or DNS cname masquerades (e.g., the use of first party sub-domains that have DNS records belonging to unaffiliated third parties). Further, for forensic data associated with video players or video content, agent 862 may also determine whether video information (e.g., title and content) is inadvertently shared and/or leaked to third parties.

Additionally, agent 862 may process the forensic data to identify potential vulnerabilities induced by mobile devices in step 1006. For example, agent 862 may emulate a mobile device to identify the presence and function of a privacy policy within an application store accessible to the mobile device (e.g., iTunes, the Apple App Store, or Google Play), to determine whether "short notice" mechanisms and/or consent checks are rendered before an use of an obtained application, and to ensure that corresponding opt-out mechanisms function appropriately and effectively halt data collection and/or targeting.

In order to analyze the forensic data for potential privacy vulnerabilities in step 1106, agent 862 may perform one or more types of specific analytical operations on the identified forensic data. In an embodiment, the specific tests may correspond to specific types of data within the identified forensic data, and include, but are not limited to, hyperlink tests, image tests, LSO tests, cookie tests, and page tests.

For example, when the forensic data includes a hyperlink, agent 862 may perform a "hyperlink test" on the forensic data in step 1106 to check the hyperlink for appropriate text (e.g. an appropriate Privacy Policy), a working target (i.e., that the hyperlink target is not broken and points directly to the appropriate destination), and the hyperlink is visible and clickable (e.g., not covered or buried under other elements). Further, when the forensic data includes an image call (e.g., an "Ad Choices" icon), agent 862 may perform an "image test" on the forensic data in step 1106 to ensure that an image associated with the image call is visible (e.g., not covered or buried under other elements), and that the image call returns successfully and with an appropriate image (e.g., that a checksum matches a known "good" image, or through an application of an appropriate pattern recognition algorithm).

When the forensic data includes a LSO (e.g., a tracking cookie), the LSO may be analyzed in step 1106 to determine the presence or specific types of prohibited data (e.g., personal or sensitive information), to identify whether the LSO has expired, and/or to determine whether the LSO has been physically written to a local storage device and returned during a subsequent call (e.g., the transmission of a HTTP request). However, the number of specific steps of a test applied to a particular LSO within the forensic data may vary based on the LSO type (e.g., whether the LSO is a tracking cookie, whether the value of the LSO is encoded in Flash, whether the LSO is included within an SQLite database, or whether the LSO references a digital fingerprint).

Additionally, when the forensic data includes an image or rendered content associated with a particular web page, agent 862 may perform an "page test" on the forensic data in step 1006 to determine whether HTML or Javascript code corresponding to the image includes specified content/values in the form of HTML tags or text, controls (e.g. an opt-out button or an "I agree" checkbox), elements, or code necessary to perform a function or display an "opt-out" feature. In such embodiments, agent 862 may leverage optical character and pattern recognition techniques to detect the presence of the specified elements and values within the image.

Referring back to FIG. 11, upon completion of the analytical operation on identified forensic data by agent 862, testing server 860 may format the output of the requested test in step 1108, and then transmit the formatted output to job manager server 830 in step 1110. Exemplary method 1100 is then complete in step 1112.

As described above, upon completion of the requested analytical operation, job manager server 830 may generate a report indicating the completion of the requested analytical operation, which may include at least a portion of the output of the analytical operation. The generated report may then be transmitted to the input source, and additionally or alternatively, may be disseminated to multiple parties associated with an email list or published on a web-based intranet (e.g., as a web page). In such embodiments, the generated report may indicate a level of compliance with one or more privacy regulations set forth by U.S. authorities, foreign government, and self-regulatory organizations, as described above.

In the embodiments described above, agents 862 and 864 of testing server 860 may analyze and conduct tests on specific portions of forensic data within forensic repository 840 (e.g., as part of step 1106 of FIG. 11) to ensure the compliance of a specific advertising or content-provider network (e.g., those provided by AOL) with guidelines set forth by self-regulatory organizations (e.g., NIA, DAA, and IAB), with standards organization (e.g., W3C), with U.S. state and federal privacy laws, and with privacy laws within the European Union. In such embodiments, agents 862 and 864 may conduct regional- and organizational-specific tests on portions of the forensic data portions to ensure compliance with privacy and security regulations, and consent mechanisms.

For example, to comply with privacy regulations in California, agents 862 and 864 may analyze portions of the forensic data corresponding to the network to ensure that each page "owned and operated" by the network includes a link to a current privacy policy, which itself must include working links to the DAA, the NAI, and/or an operational behavioral advertising opt-out. In such embodiments, the test performed by agents 862 and 864 may ensure concurrency among privacy policies on the web pages associated with the network (including co-branded web sites and sites not controlled by the network's content management service (CMS)) and to detect when an outdated privacy policy is presented to a user.

Furthermore, each of the self-regulatory organizations (e.g., the DAA, the NIA, and the IAB) require that the network provide its users with an opt-out function that, upon execution, halts behavioral advertising targeted to the users. In order to ensure compliance among web pages and sites owned and operated by the advertising or content-provider network, agents 862 and 864 may analyze cookies, HTTP calls, and server responses within corresponding portions of the forensic data to ensure that the user's opt-out preference is stored persistently (and not overwritten) and respected by future interactions with advertising servers. Agents 862 and 864 may further ensure that the forensic data portion accurately reports whether or not the user is currently being tracked (opted in), not being tracked (opted out), or has no tracking state (all cookies empty). In such embodiments, the reported opt-out state reported to the input source by job manager server 830 (e.g., via a corresponding graphical user interface or web page) may reflect the content of a persistent opt-out cookie.

To ensure further compliance with the opt-out function, agents 862 and 864 may examine corresponding portions of the forensic data to ensure that each opt-out mechanism functions identically and consistently, regardless of origin/opt-out portal (i.e. all portals should be in complete agreement with regards to the user's current opt-out state). Furthermore, upon execution of a successful opt-out request, agents 852 and 854, and additionally or alternatively, agents 864 and 864, may surf the network with the opt-out preference enabled and look for instances where behavioral advertising occurs or the opt-out preference is inappropriately rescinded/overwritten. At the conclusion of the surf session, the opt-out portal will be revisited to ensure that the current opt-out state is still accurately reported.

The embodiments described above also enable agents 862 and 864 of testing server 860 to ensure that an advertising or content-provider network complies with both the technical and policy protocols of the "Do Not Track" specification proposed by the World Wide Web Consortium (W3C). For example, upon enablement of a Do Not Track (DNT) signal (e.g., enabling an HTTP header with the value of "DNT: 1"), agents 862 and 864 may analyze forensic data corresponding to the advertising or content-provider network to ensure that the network properly acknowledges the user's intent not to be tracked, and as such, that no behavioral advertising or information sharing with third-party entities occurs. Further, upon enablement of a tracking exception (i.e. request to track, despite the DNT signal), agents 862 and 864 may analyze forensic data corresponding to the advertising or content-provider network to ensure that normal tracking resumes. Additionally, upon revocation of the tracking exception, agents 862 and 864 may analyze forensic data corresponding to the advertising or content-provider network to ensure that the network respects the initial DNT signal.

In additional embodiments, 862 and 864 may analyze forensic data corresponding to an advertising or content-provider network to ensure that the advertising or content-provider network complies with the Children's Online Privacy Protection Act (COPPA), which prohibits websites intended for children under thirteen from collecting data absent parental consent. For example, agents 862 and 864 may test the forensic data to ensure that parental control and consent mechanisms are available and properly functioning; may scan the forensic data to identify known code, tags, pixels, or calls that enable behavioral advertising or geo-location algorithms; may identify pages associated with preteen login credentials that enable the collection or sharing of specific account information; and/or may scan portions of the forensic data associated with emulated mobile applications for sharing or use of device identifiers for secondary purposes.

Agents 862 and 864 of testing server 860 may also analyze forensic data corresponding to an advertising or content-provider network to ensure compliance with EU privacy regulations. In such embodiments, agents 864 and 864 may scan portions of the forensic data associated with EU-specific websites to ensure that notice, consent, and choice mechanisms are served and rendered appropriately. Additionally, agents 862 and 864 may identify websites within the forensic data associated with EU countries requiring explicit consent, and execute the consent mechanisms and/or scan the identified websites to ensure no data collection occurs prior to a consent/opt-in event. Moreover, agents 864 and 864 may also scan the forensic data for websites associated those EU countries allowing implied consent to ensure that no data collection occurs after an opt-out event.

In additional embodiments, agents 852 and 854 of web scanning agent 850 may, during performance of a requested scan, catalogue all calls, domains, and objects within local registries to generate a comprehensive registry of web entities within forensic repository 840. For example, agents 852 and 854 may leverage DNS and WHOIS information to determine the ownership of unknown domains and IP addresses, and based on entity type (e.g., analytics provider or advertiser), agents 852 and 854 may update object functions within the comprehensive registry. In additional embodiments, the generation and maintenance of the comprehensive registry of web entities may be performed by agent 872 of miscellaneous job server 870, as described above.

Further, in an embodiment, agents 862 and 864 may analyze forensic data corresponding to an advertising or content-provider network to ensure compliance with enhanced notice regulations set forth in the DAA's Code of Ethics. By way of example, agents 862 and 864 may scan the forensic data to identify pages associated with the network that include advertisements, and to ensure that the identified pages include calls for the "Ad Choices" icon (or alternatively, include a clickable "Ad Choices" overlay if embedded in a Flash-based advertisement). Furthermore, agents 862 and 864 may ensure that the identified pages include active "About Our Ads" disposed at or near the bottom of the corresponding pages, and that the "Ad Choices" icons or links must successfully direct a browser to the "Ad Info" landing page.

Further, as noted above, agents 862 and 864 may conduct regional- and organizational-specific tests on portions of the forensic data portions to ensure compliance with content mechanisms mandated or contemplated by various governmental and non-governmental entities (e.g., the European Union or U.S. government in satisfaction of COPPA). For example, these governmental and non-governmental entities may require that websites and other graphical user interfaces obtain express user consent for tracking before the user interacts with the website or graphical user interface. In such embodiments, agents 862 and 864 may execute a content mechanism implemented by a website or graphical user interface to ensure that the consent mechanism operates properly (e.g., provides proper notice to the user, receives a user response to the notice, and takes appropriate actions in accordance with the user's response).

By way of example, the consent mechanism for a website may include an interstitial or pop-up window rendered and presented to a user in response to a request to access the website. The window may, for example, identify the use of behavioral tracking on the website, provide a link to the website's privacy policy, provide a link to information describing how the user may disable behavioral tracking, and enable the user to consent to behavioral tracking (e.g., by closing the window). In such embodiments, agents 862 and 864 may test the compliance of the consent mechanisms by rendering the window, ensuring the proper information in provided to the user, and ensuring that content provided by the user, or alternatively, a lack of consent, is respected by advertisers (e.g., advertising system 140).

In the embodiments described above, reference is made to various "cookies" leverages by opt-out and advertising systems to facilitate, limit, and clock various forms of tracking. The disclosed embodiments are, however, not limited to such exemplary objects, and in additional embodiments, one or more of the testing, opt-out, and advertising servers may leverage any additional statement management mechanism to facilitate, limit, and clock various forms tracking.

Further, in the embodiments described above, agents 852 and 854 of web scanning server 850 may execute requested scans, agents 862 and 864 of testing may perform requested test on portions of stored forensic data, and agent 872 of miscellaneous job server 870 may perform requested miscellaneous jobs. In such embodiments, one or more agents 852, 854, 862, 864, and 872 correspond to processor based devices (e.g., computer system 170 of FIG. 1B) in communication with corresponding ones of servers 850, 860, and 870. The disclosed embodiments are not limited to such physical devices, and in further embodiments, a function of one or more agents 852, 854, 862, 864, and 872 may be performed by software executed by corresponding ones of servers 850, 860, and 870.

Furthermore, while reference in made in the disclosed embodiments to a function performed by agent 852 (or alternatively by agent 864) is made for exemplary purposes only. One of skill in the art would recognize that such a function could be performed by agent 854 (or alternatively, agent 864) without departing from the spirit or scope of the disclosed embodiments. Furthermore, one of skill in the art would also recognize that agents 852 and 854 may simultaneously scan separate websites or groups of websites, and agents 862 and 864 may simultaneously scan separate portions of forensic data within forensic repository 840 without departing from the spirit or scope of the disclosed embodiments.

Various embodiments have been described herein with reference to the accompanying drawings. It will, however, be evident that various modifications and changes may be made thereto, and additional embodiments may be implemented, without departing from the broader scope of the present disclosure.

Further, other embodiments will be apparent to those skilled in the art from consideration of the specification and practice of one or more embodiments disclosed herein. It is intended, therefore, that this disclosure and the examples herein be considered as exemplary only, with a true scope and spirit of the invention being indicated by the following listing of exemplary claims.

What is claimed is:

1. A computer-implemented method, comprising:
obtaining, using at least one processor, polling information indicative of an availability of a server to execute an operation on content associated with at least one web page, the operation corresponding to a functionality of the at least one web page;
determining, based on the polling data, whether the server is capable of executing the operation;
when the server is capable of executing the operation, generating, using the at least one processor, an instruction to transmit first configuration data to the server, the first configuration data instructing the server to execute the operation on the content associated with the at least one web page to simulate the functionality of the at least one web page in accordance with the configuration data and generate first output data characterizing at least one of a privacy policy or a security policy of the least one web page;
obtaining the first output data from the server, the first output data characterizing the at least one of privacy or security policy of the at least one web page; and
generating, using the at least one processor, information indicating whether the at least one privacy or security policy of the at least one web page complies with a corresponding privacy regulation or security regulation established by at least one of a governmental entity or a regulatory organization, the information being generated based on the obtained first output data.

2. The method of claim 1, wherein the first configuration data identifies the operation and the at least one web page.

3. The method of claim 2, wherein:
the method further comprises receiving a request to execute the operation from an input source;
the obtaining comprises receiving the polling information from the server; and
the determining comprises determining whether that the server is capable of executing the operation, based on the received request and the polling data.

4. The method of claim 1, wherein:
the operation executed by the server generates forensic data corresponding to the simulated functionality of the at least one web page; and
the forensic data comprises at least one of a cache file, a script file, information associated with a data stream, a locally-stored object, image data, information indicative of system failure, information indicative of unexpected access or changes to an integrity of a file system, or sensitive or personal information associated with one or more users.

5. The method of claim 4, wherein:
the operation comprises a scanning operation; and
the method further comprises generating an instruction to cause the server to store at least a portion of the forensic data in a repository.

6. The method of claim 5, wherein:
the output data comprises confirmation of a completion of the scanning operation; and
the method further comprises generating, in response to the confirmation, a report indicative of the completion of the scanning operation.

7. The method of claim 5, further comprising:
determining, based on the polling data, whether the server is capable of executing an analytical operation that analyzes at least a portion of the forensic data, the analytical operation comprising at least one of an operation performed on a hyperlink within the forensic data, an operation performed on an image call within the forensic data, an operation applied to a locally-stored object within the forensic data, or an operation applied to an image of the web page within the forensic data;
transmitting second configuration data to the server when the server is capable of executing the analytical operation; and
obtaining second output data associated with the executed analytical operation that characterizes the at least one privacy or security policy of the at least one web page.

8. The method of claim 1, further comprising generating a report based on at least a portion of the first output data, the report comprising the information indicative of the compliance of the at least one privacy or security policy of the at least one web page with the corresponding privacy regulation or security regulation.

9. The method of claim 1, further comprising:
instructing the execution of the operation on content associated with a graphical user interface accessible to a user of a mobile device; and
generating, based on the first output data, information indicative of a compliance of the graphical user interface with at least one of the privacy regulation or the security regulation.

10. The method of claim 1, further comprising:
generating an instruction to transmit, to an opt-out system associated with the server, a request to test at least one of the opt-out system or an advertising system;
receiving a data stream sent in response to the request; and
determining an outcome of the test based on the data stream.

11. The method of claim 10, wherein the test comprises at least one of a test to determine a functionality of a website of the opt-out system, a test to determine a functionality of a web page of the website, a test to determine whether the web page includes elements enabling a user to opt-out, or a test to determine whether the opt-out system responds appropriately based on a selection of one or more of the elements.

12. The method of claim 10, further comprising receiving an opt-out cookie from the advertising system.

13. The method of claim 12, wherein determining the outcome comprises determining at least one of whether a unique identifier of the opt-out cookie is equal to a dummy value, whether a tracking value is set to a predetermined opt-out tracking value, or whether a minimum lifespan of the opt-out cookie is equal to or greater than a predetermined minimum lifespan.

14. The computer-implemented method of claim 12, further comprising generating an instruction to transmit, after receiving the opt-out cookie, an additional request to the opt-out system to test an indicator on a website of the opt-out system, wherein the indicator identifies a cookie associated with the advertising system.

15. The computer-implemented method of claim 14, further comprising:
receiving, in response to the additional request, an additional data stream comprising an image of the indicator; and
determining whether the indicator corresponds to the opt-out cookie based on a checksum or pattern match on the image.

16. A computer-implemented method, comprising:
obtaining, using at least one processor, polling information indicative of an availability of a server to perform a scanning operation on a web page that simulates at least one functionality of the web page;
determining, based on the polling data, whether the server is capable of executing the scanning operation;
when the server is capable of executing the scanning operation, transmitting, using the at least one processor, an instruction to the server to cause the server to perform the scanning operation on the web page to simulate the at least one functionality of the web page;
obtaining forensic data from the server, the forensic data being generated by the server during execution of the scanning operation, and the forensic data being indicative of a compliance of at least one of a privacy or security policy of the web page with a corresponding privacy regulation or security regulation established by at least one of a governmental entity or a regulatory organization; and
generating, with at least one processor, an instruction to store at least a portion of the forensic data in a repository.

17. The method of claim 16, wherein the forensic data comprises at least one of a cache file, a script file, information associated with a data stream, a locally-stored object, image data, information indicative of system failure, information indicative of unexpected changes to an integrity of a file system, or sensitive or personal information associated with one or more users.

18. An apparatus, comprising:
a storage device; and
at least one processor coupled to the storage device, wherein the storage device stores a program for controlling the at least one processor, and wherein the at least one processor, being operative with the program, is configured to:
obtain polling information indicative of an availability of a server to execute an operation on content associated with at least one web page, the operation corresponding to a functionality of the at least one web page;
determine, based on the polling data, whether the server is capable of executing the operation;
transmit first configuration data to the server when the server is capable of executing the operation, the first configuration data instructing the server to execute the operation on the content associated with at least one web page to simulate the functionality of the at least one web page in accordance with the configuration data and generate first output data characterizing at least one of a privacy policy or a security policy of the at least one web page;
obtain the first output data from the server, the first output data characterizing the at least one of privacy or security policy of the at least one web page; and
generate information indicative of a compliance of the at least one privacy or security policy of the at least one web page with a corresponding privacy regulation or security regulation established by at least one of a governmental entity or a regulatory organization, the information being generated based on the first output data.

19. The apparatus of claim 18, wherein the first configuration data identifies the operation and the at least one web page.

20. The apparatus of claim 19, wherein the at least one processor is further configured to:
receive a request to execute the operation from an input source;
receive the polling information from the server; and
determine whether the server is capable of executing the operation, based on the received request and the polling data.

21. The apparatus of claim 18, wherein:
the operation executed by the server generates forensic data corresponding to the simulated functionality of the at least one web page; and
the forensic data comprises at least one of a cache file, a script file, information associated with a data stream, a locally-stored object, image data, information indicative of system failure, information indicative of unexpected changes to an integrity of a file system, or sensitive or personal information associated with one or more users.

22. The apparatus of claim 21, wherein the at least one processor is further configured to:
determine, based on the polling data, whether the server is capable of executing an analytical operation that analyzes at least a portion of the forensic data, the analytical operation comprising at least one of an operation performed on a hyperlink within the forensic data, an operation performed on an image call within the forensic data, an operation applied to a locally-stored object within the forensic data, or an operation applied to an image of the web page within the forensic data;
transmit second configuration data to the server when the server is capable of executing the analytical operation; and
obtain second output data associated with the executed analytical operation that characterizes the at least one privacy or security policy of the at least one web page.

23. A tangible, non-transitory computer-readable medium storing instructions that, when executed by at least one processor, perform a method comprising the steps of:
obtaining polling information indicative of an availability of a server to execute an operation on content associated with at least one web page, the operation corresponding to a functionality of the at least one web page;
determining, based on the polling data, whether the server is capable of executing the operation;
when the server is capable of executing the operation, generating an instruction to transmit first configuration data to the server, the first configuration data instructing the server to execute the operation on the content associated with the at least one web page to simulate the functionality of the at least one web page in accordance with the configuration data and generate first output data characterizing at least one of a privacy policy or a security policy of the at least one web page;
obtaining the first output data from the server, the first output data characterizing the at least one of privacy or security policy of the at least one web page; and
generating information indicating whether the at least one privacy or security policy of the at least one web page complies with a corresponding privacy regulation or security regulation established by at least one of a governmental entity or a regulatory organization, the information being generated based on the obtained first output data.

24. The computer readable medium of claim 23, wherein the operation capable of being performed by the server comprises an analytical operation, the analytical operation including at least one of a first operation performed on a hyperlink within forensic data generated by the server, a second operation performed on an image call within the forensic data, a third operation applied to a locally-stored object within the forensic data, or a fourth operation applied to the image of the at least one web page.

25. The method of claim 1, wherein the first configuration data further instructs the server to determine whether advertising identifiers associated with the at least one web page share at least one of a common storage space, a common domain space, or a common storage mechanism with personal information associated with at least one user.

26. The method of claim 1, wherein the first configuration data further instructs the server to emulate a mobile communications device and to simulate the functionality of the at least one web page accessed by the emulated mobile communications device.

27. A server, comprising:
   a storage device that stores instructions; and
   at least one processor coupled to the storage device to execute the instructions and configure the at least one processor to:

obtain, from a requesting device, configuration data identifying a web page and at least one operation that, when executed by the server, simulates at least one functionality of the web page;

executing the at least one operation on content associated with the web page to simulate the at least one functionality of the web page;

based on the at least one simulated functionality, generate information indicative of a compliance of at least one privacy or security policy of the web page with a corresponding privacy or security regulation established by at least one of a governmental entity or a regulatory organization; and transmit output data associated with the at least one executed operation to the requesting device, the output data comprising the generated information.

\* \* \* \* \*